United States Patent
Kim

(10) Patent No.: US 11,741,576 B2
(45) Date of Patent: Aug. 29, 2023

(54) IMAGE SYSTEM INCLUDING IMAGE SIGNAL PROCESSOR AND OPERATION METHOD OF IMAGE SIGNAL PROCESSOR

(71) Applicant: SAMSUNG ELECTRONICS CO., LTD., Suwon-si (KR)

(72) Inventor: Hyuncheol Kim, Daegu (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 328 days.

(21) Appl. No.: 17/207,319

(22) Filed: Mar. 19, 2021

(65) Prior Publication Data
US 2021/0304366 A1 Sep. 30, 2021

(30) Foreign Application Priority Data
Mar. 30, 2020 (KR) .................... 10-2020-0038285

(51) Int. Cl.
*G06T 5/00* (2006.01)
*H04N 1/58* (2006.01)
(Continued)

(52) U.S. Cl.
CPC ............ *G06T 5/002* (2013.01); *H04N 1/58* (2013.01); *H04N 9/646* (2013.01); *H04N 9/7908* (2013.01)

(58) Field of Classification Search
CPC .......... G06T 5/002; G06T 2207/10024; G06T 2207/20016; G06T 2207/20208; G06T 5/40; G06T 5/009; G06T 1/20; G06T 3/40; G06T 5/10; G06T 5/00; G06T 5/007; G06T 2207/20021; G06T 2207/20221; G06T 2207/20228; G06T 2207/20182;
(Continued)

(56) References Cited

U.S. PATENT DOCUMENTS 7,149,262 B1 12/2006 Nayar et al.
8,457,418 B2 6/2013 Jerdev
(Continued)

FOREIGN PATENT DOCUMENTS

KR 10-1496755 B1 2/2015
KR 10-1515444 B1 4/2015
(Continued)

OTHER PUBLICATIONS

Li Tao et al., "An Illuminance-Reflectance Model for Nonlinear Enhancement of Color Images", IEEE, 2005, pp. 1-8 (8 pages total).
(Continued)

*Primary Examiner* — Jose L Couso
(74) *Attorney, Agent, or Firm* — Sughrue Mion, PLLC

(57) ABSTRACT

Provided is an operation method of an image signal processor (ISP) configured to perform signal processing on a raw image received from an image device, the operation method including generating a plurality of multi-scale images based on an input image, the plurality of multi-scale images having resolutions that are different from each other, iteratively performing a fast global weighted least squares (FGWLS) based operation on each of the plurality of multi-scale images to generate a final illuminance map, and outputting an enhanced image based on the final illuminance map and the input image.

20 Claims, 16 Drawing Sheets

(51) Int. Cl.
*H04N 9/79* (2006.01)
*H04N 9/64* (2023.01)

(58) Field of Classification Search
CPC . G06T 2207/20192; G06T 5/003; G06T 5/20; G06T 15/205; G06T 3/4015; G06T 3/4053; G06T 3/4007; G06T 2207/20024; G06T 7/50; G06T 7/90; H04N 1/58; H04N 9/646; H04N 9/7908; H04N 5/911; H04N 9/643; H04N 1/6075; H04N 13/128; H04N 13/271; H04N 1/409; H04N 9/4092; H04N 23/843; H04N 25/57; H04N 23/71; H04N 23/683; H04N 23/741; H04N 23/815; H04N 19/117; G06V 10/20; G06V 10/28; G06K 9/36; G06K 9/54; G06K 9/60; G06K 9/605; G06K 15/1872; G06K 9/80

See application file for complete search history.

(56) References Cited

U.S. PATENT DOCUMENTS

| | | | |
|---|---|---|---|
| 8,472,748 | B2 | 6/2013 | Jang et al. |
| 9,208,539 | B2 | 12/2015 | Choudhury et al. |
| 9,275,605 | B2 | 3/2016 | Longhurst et al. |
| 9,483,815 | B2* | 11/2016 | Boyadzhiev ............. G06T 5/50 |
| 9,842,382 | B2 | 12/2017 | Park et al. |
| 10,198,812 | B2 | 2/2019 | Tang et al. |
| 10,382,684 | B2 | 8/2019 | Moriuchi et al. |
| 2013/0016905 | A1 | 1/2013 | Park et al. |
| 2016/0027160 | A1* | 1/2016 | Aydin ...................... G06T 5/50 382/162 |
| 2016/0117800 | A1* | 4/2016 | Korkin .................... H04N 9/69 348/239 |
| 2017/0054910 | A1* | 2/2017 | Moriuchi ................ G06T 5/003 |
| 2019/0327417 | A1* | 10/2019 | Moriuchi ............. H04N 23/683 |
| 2020/0007854 | A1* | 1/2020 | Ogawa .................. H04N 23/80 |
| 2020/0012908 | A1* | 1/2020 | Miyazaki ............. H04N 13/122 |
| 2020/0311876 | A1* | 10/2020 | Senzaki ................. G06T 5/002 |

FOREIGN PATENT DOCUMENTS

| | | |
|---|---|---|
| KR | 10-1577918 B1 | 12/2015 |
| KR | 10-1828180 B1 | 2/2018 |
| WO | 2017/217395 A1 | 12/2017 |

OTHER PUBLICATIONS

Daniel J. Jobson et al., "A Multiscale Retinex for Bridging the Gap Between Color Images and the Human Observation of Scenes", IEEE Transactions on Image Processing, Jul. 1997, vol. 6, No. 7, pp. 965-976 (12 pages total).
C. Tomasi et al., "Bilateral Filtering for Gray and Color Images", IEEE International Conference on Computer Vision, 1998, pp. 839-846 (8 pages total).
Kaiming He et al., "Guided Image Filtering", IEEE Transactions on Pattern Analysis and Machine Intelligence, 2013, vol. 35, pp. 1-13 (13 pages total).
Zhengguo Li et al., "Weighted Guided Image Filtering", IEEE Transactions on Image Processing, Jan. 2015, vol. 24, No. 1, pp. 120-129 (10 pages total).
Fei Kou et al., "Gradient Domain Guided Image Filtering", IEEE Transactions on Image Processing, 2015, vol. 24, No. 11, pp. 4528-4539 (12 pages total).
Zeev Farbman et al., "Edge-Preserving Decompositions for Multi-Scale Tone and Detail Manipulation", ACM Transactions on Graphics, Aug. 2008, vol. 27, No. 3, Article 67, pp. 67:1-67:10 (10 pages total).
Xiaojie Guo et al., "LIME: Low-light Image Enhancement via Illumination Map Estimation", IEEE Transactions on Image Processing, Dec. 3, 2016, pp. 1-12 (12 pages total).
Mading Li et al., "Structure-Revealing Low-Light Image Enhancement Via Robust Retinex Model", IEEE Transactions on Image Processing, Jun. 2018, vol. 27, No. 6, pp. 2828-2841 (14 pages total).
Dongbo Min et al., "Fast Global Image Smoothing Based on Weighted Least Squares", IEEE Transaction on Image Processing, 2013, pp. 1-15 (15 pages total).
Kostadin Dabov et al., "Image denoising by sparse 3D transform-domain collaborative filtering", IEEE Transactions on Image Processing, Aug. 2007, vol. 16, No. 8, pp. 1-16 (16 pages total).
Harold C. Burger et al., "Image denoising: Can plain Neural Networks compete with BM3D?", http://people.tuebingen.mpg.de/burger/neural_denoising/, 2012, pp. 4321-4328 (8 pages total).
Shuhang Gu et al., "Weighted Nuclear Norm Minimization with Application to Image Denoising", Computer Vision Foundation, 2014, pp. 1-8 (8 pages total).

* cited by examiner

IMAGE SYSTEM INCLUDING IMAGE SIGNAL PROCESSOR AND OPERATION METHOD OF IMAGE SIGNAL PROCESSOR

CROSS-REFERENCE TO RELATED APPLICATIONS

This application claims priority under 35 U.S.C. § 119 to Korean Patent Application No. 10-2020-0038285 filed on Mar. 30, 2020, in the Korean Intellectual Property Office, the disclosures of which are incorporated by reference herein in their entireties.

BACKGROUND

Example embodiments of the present disclosure relate to an image device, and more particularly, relate to an image system including an image signal processor and an operation method of the image signal processor.

An image sensor included in a smartphone, a tablet personal computer (PC), or a digital camera obtains image information about an external object by converting a light reflected from the external object into an electrical signal. Various image signal processing operations are performed to convert an electrical signal obtained from the image sensor into image information actually perceivable by a person or to improve an image quality.

SUMMARY

One or more example embodiments provide an image system including an image signal processing unit and an operation method of the image signal processor.

According to an aspect of an example embodiment, there is provided an operation method of an image signal processor (ISP) configured to perform signal processing on a raw image received from an image device, the operation method including generating a plurality of multi-scale images based on an input image, the plurality of multi-scale images having resolutions that are different from each other, iteratively performing a fast global weighted least squares (FGWLS) based operation on each of the plurality of multi-scale images to generate a final illuminance map, and outputting an enhanced image based on the final illuminance map and the input image.

According to an aspect of an example embodiment, there is provided an image system including an image sensor configured to output a raw image based on a light reflected from an external object, and an image signal processor configured to perform pre-processing on the raw image to generate an input image, extract a final illuminance map based on the input image through a multi-scale based extraction operation, and generate an enhanced image based on the final illuminance map and the input image, wherein the multi-scale based extraction operation includes generating a plurality of multi-scale images having different resolutions based on the input image, iteratively performing an illuminance map extraction operation on the plurality of multi-scale images, and outputting the final illuminance map as a result of iteratively performing the illuminance map extraction operation.

In an exemplary embodiment, the illuminance map extraction operation is performed based on:

$$L^i(x, y) = \begin{cases} FGWLS(\uparrow_n(L^{i+1}(x, y)), G^i(x, y), \lambda^i, T^i), & i = 0, \dots, l-1 \\ FGWLS(\hat{L}^i(x, y), G^i(x, y), \lambda^i, T^i), & i = l \end{cases}$$

in which the (x,y) indicates a pixel location, the FGWLS indicates a function for a fast global weighted least squares (FGWLS) based operation, the $L^i$ indicates a calculation result of the FGWLS, the $\uparrow_n$ indicates a function to scale up an input as much as the n times, the $\hat{L}^i$ indicates an illuminance map obtained by scaling down the initial illuminance map as much as $n^l$ times, the $G^i$ indicates a guidance image, the $\lambda^i$ indicates a flattening level used in the function of the FGWLS based operation, and the $T^i$ indicates a number of times of row-based calculation and column-based calculation used in the function for the FGWLS based operation, and the illuminance map extraction operation is performed based on the "i" that stepwise changes from "l" to "0".

According to yet another aspect of an example embodiment, there is provided an image contrast enhancing method of an image signal processor, the method including generating an initial illuminance map based on an input image, iteratively scaling down the initial illuminance map as much as n times to generate a plurality of multi-scale images, where n is a positive integer greater than 1, performing a first calculation based on a first image having a lowest resolution from among the plurality of multi-scale images, performing a second calculation based on a result of the first calculation and a second image having a second lowest resolution from among the plurality of multi-scale images, performing a third calculation based on a result of the second calculation and a third image having a highest resolution from among the plurality of multi-scale images, generating a result of the third calculation as a final illuminance map, and generating an enhanced image based on the final illuminance map and the input image, wherein the first calculation, the second calculation, and the third calculation are based on fast global weighted least squares (FGWLS).

BRIEF DESCRIPTION OF THE FIGURES

The above and/or other aspects will become apparent by describing in detail example embodiments with reference to the accompanying drawings, in which.

DETAILED DESCRIPTION

Hereinafter, example embodiments may be described in detail and clearly to such an extent that a person of ordinary skill in the art may implement the example embodiments.

Hereinafter, components described in the detailed description with reference to the terms "part", "unit", "module", "layer", etc. and function blocks illustrated in drawings may be implemented in the form of software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
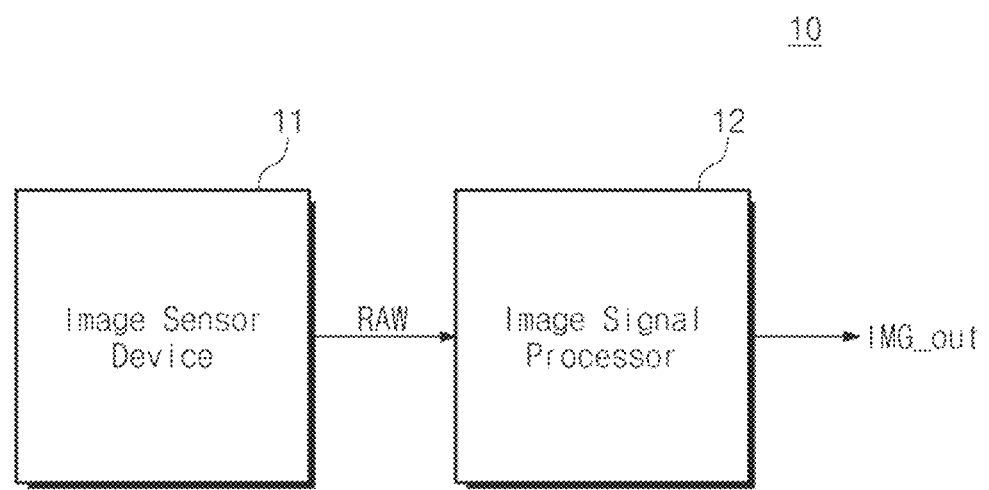
FIG. 1 is a block diagram illustrating an image system according to an example embodiment.

FIG. 1 is a block diagram illustrating an image system according to example an embodiment. Referring to FIG. 1, an imaging system 10 may include an image sensor 11 and an image signal processor 12. The imaging system 10 may be at least one of various electronic systems, which are configured to obtain a video or an image associated with an external object, such as, for example, a smartphone, a tablet, a black box, and an electronic device for vehicle or may be included therein.

The image sensor 11 may receive a light reflected from the external object and may obtain an image, image information, or image data associated with the external object based on the received light. For example, the image sensor 11 may include at least one of various image sensors such as a complementary metal-oxide-semiconductor (CMOS) image sensor, a charge-coupled device (CCD) image sensor, and a dynamic vision sensor (DVS) image sensor. The image sensor 11 may output an image generated based on the light reflected from the external object, as a raw image RAW. In an example embodiment, the raw image RAW may indicate image data obtained by the image sensor 11. That is, the raw image RAW may be the original of image data that have not gone under separate image processing. The raw image RAW may be an image that experiences image processing, for example, high-dynamic-range (HDR) or wide-dynamic-range (WDR) performed in the image sensor 11.

The image signal processor 12 may receive the raw image RAW from the image sensor 11 and may perform image signal processing on the received raw image RAW. The image signal processor 12 may output, as a result of the image signal processing, output image IMG_out. In an example embodiment, the output image IMG_out may have an enhanced image quality compared to the raw image RAW. The output image IMG_out may be provided to an external device, for example, an application processor (AP), a graphic processor (GPU), or a display device.

Figure 2:
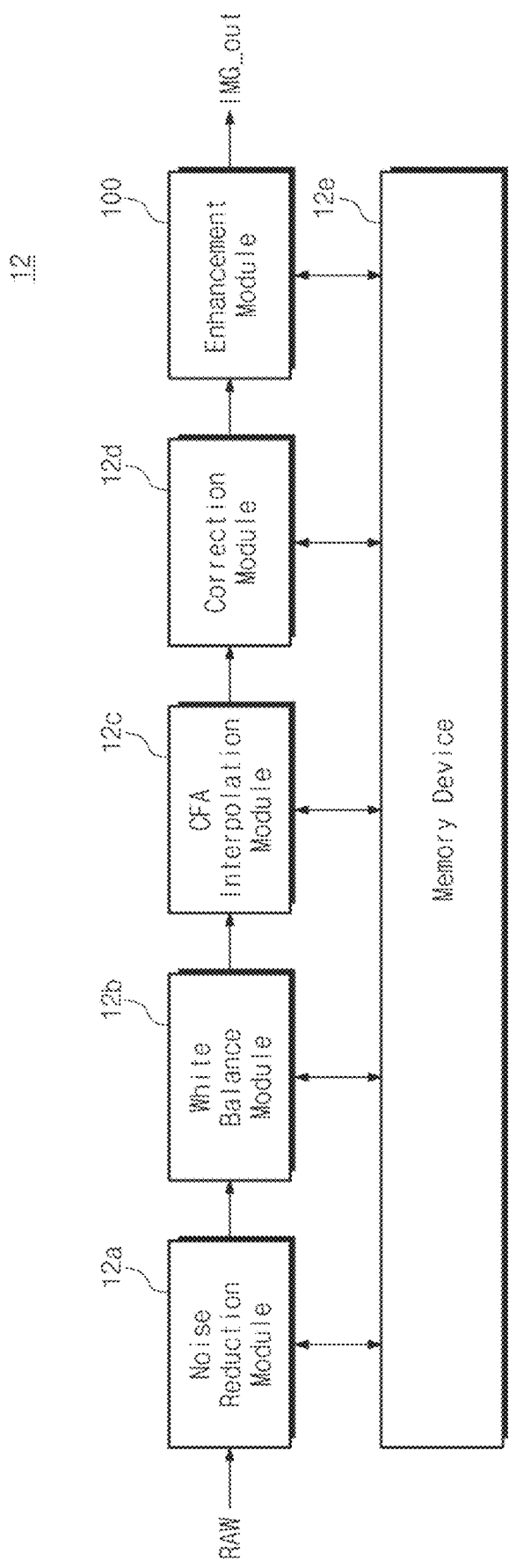
FIG. 2 is a block diagram illustrating an image signal processing unit of FIG. 1.

FIG. 2 is a block diagram illustrating an image signal processor of FIG. 1. Referring to FIGS. 1 and 2, the image signal processor 12 may perform various image signal processing on the raw image RAW received from the image sensor 11 and may generate or output the output image IMG_out having an enhanced quality. For example, the image signal processor 12 may include a noise reduction module 12a, a white balance module 12b, a color filter array interpolation module 12c, a correction module 12d, an enhancement module 100, and a memory device 12e.

The noise reduction module 12a may perform image signal processing, for example, noise reduction for reducing a noise of the raw image RAW received from the image sensor 11. The white balance module 12b may perform image signal processing, for example, while balancing on an output of the noise reduction module 12a. The color filter array interpolation module 12c may perform image signal processing, for example, color interpolation based on a color filter array of the image sensor 11 on an output of the white balance module 12b. The correction module 12d may perform image signal processing, for example, correction based on various factors such as a color and a gamma characteristic on an output of the color filter array interpolation module 12c.

The enhancement module 100 may perform image signal processing, for example, an enhancement operation for enhancing an image quality such as an edge, a contrast, and a color on an output of the correction module 12d. An output of the enhancement module 100 may be output as the output image IMG_out. The memory device 12e may be configured to store outputs or intermediate results of the noise reduction module 12a, the white balance module 12b, the CFA interpolation module 12c, the correction module 12d, and the enhancement module 100 included in the image signal processor 12.

As described above, the image signal processor 12 may generate the output image IMG_out having an enhanced quality by performing various image signal processing on the raw image RAW from the image sensor 11. In an example embodiment, the configuration or the image signal processing operation of the image signal processor 12 illustrated in FIG. 2 is example, and embodiments are not limited thereto. For example, the image signal processor 12 may perform image signal processing on the raw image RAW, based on a configuration different from the configuration illustrated in FIG. 2.

In an example embodiment, the enhancement module 100 of the image signal processor 12 may be configured to perform contrast enhancement on an image. Image signal processing of the enhancement module 100 in the image signal processor 12, in detail, image signal processing for contrast enhancement will be more fully described below. For example, an example embodiment will be described as the image signal processor 12 or the enhancement module 100 performs image signal processing for contrast enhancement on an input image, but embodiments are not limited thereto.

In the case where an image is obtained in a backlit or low-illuminance environment, it may be necessary to perform image signal processing for contrast enhancement on an input image. For example, in the case where the image sensor 11 obtains an image in a photographing environment such as backlight or low illuminance, because brightness of a partial region of the obtained image is relatively low, an object included in the partial region may not be identified. To identify the object in the partial region, the brightness of the entire image may be increased. However, as brightness of a different region, for example, a relatively bright region of the image is increased together, an object included in the different region may not be identified.

Accordingly, to enhance a quality of an image obtained in a photographing environment such as backlit or low illuminance, it is important to minimize an artifact, such as halo or fading, as well as efficient improvement of a local contrast of the image. A scheme to improve a quality, for example, a contrast of an image may include a histogram based scheme, a dehaze based scheme, a filtering based scheme, a retinex based scheme, etc. The retinex based scheme among the above schemes considers that an input image is defined by illuminance and reflectance, as expressed by Equation 1 below.

$$F(x,y)=R(x,y)\cdot L(x,y) \quad \text{[Equation 1]}$$

Referring to Equation 1 above, F indicates an input image, R indicates reflectance information about the input image, L indicates illuminance information about the input image, and (x,y) indicates coordinates in the input image. As understood from Equation 1 above, the input image F may be expressed based on L being an illuminance component and R being a reflectance component.

To enhance a contrast of the input image, it is necessary to extract illuminance information or an illuminance map associated with the input image. The illuminance of the input image may be determined depending on the whole distribution of brightness in the input image, while the reflectance may be determined by a unique characteristic of an object in the input image. For example, the illuminance component of the input image may mainly include a low-frequency component, and the reflectance component of the input image may mainly include a high-frequency component. Accordingly, illuminance information or an illuminance map may be extracted by applying low pass filtering to the input image as expressed by Equation 2 below, and the reflectance may be extracted by removing information about the illuminance map from the input image as expressed by Equation 3 below.

$$L(x,y)=LPF(F(x,y)) \quad \text{[Equation 2]}$$

$$\ln R(x,y)=\ln F(x,y)-\ln L(x,y) \quad \text{[Equation 3]}$$

In Equation 2 and Equation 3, LPF indicates a function corresponding to low pass filtering, and because the remaining reference signs are described with reference to Equation 1 above. In the case where illuminance information is extracted based on Equation 2 and Equation 3, because a high-frequency component is filtered, an edge, for example, a high-frequency component may not be preserved in the extracted illuminance information or illuminance map. When the edge is not preserved in the illuminance information, an artifact such as a halo phenomenon may occur in a final image.

To solve the above issue, a scheme to extract an illuminance map based on weighted least squares (WLS) may be used. The WLS based extraction scheme indicates a scheme in which an illuminance map is extracted by obtaining an optimal solution of a matrix composed of a data term and a constraint term. The WLS based extraction scheme may strongly flatten similar brightness regions while preserving an edge of an input image. In this case, the WLS based extraction scheme may obtain an optimal solution of a matrix by calculating an inverse matrix of a sparse Laplacian matrix. In this case, an element of the sparse Laplacian matrix may indicate similarity between pixels. The WLS based extraction scheme is advantageous in that a flattening strength is great while preserving an edge. However, because the WLS based extraction scheme needs to calculate a matrix of a large size, a lot of hardware resources are used, and a calculating speed is very slow, and it may be difficult to apply the WLS based extraction scheme to a mobile application having a limited hardware resource.

A fast global weighted least squares (FGWLS) extraction scheme may be used as an enhanced version of the illuminance map extraction scheme based on WLS. The FGWLS based extraction scheme or operation may reduce the amount of a hardware resource used and an operation time by simplifying an optimal solution based on WLS. For example, the FGWLS based extraction scheme may reduce a hardware resource necessary for calculation and an operation time by iteratively performing row-based and column-based calculation, instead of performing calculation on the whole matrix. However, in the case where a size or a resolution of an input image is large, a blocking artifact may occur in an illuminance map extracted through the FGWLS based extraction scheme, and the blocking artifact may cause a decrease of a quality of the output image IMG_out.

According to an example embodiment, the image signal processor 12 or the enhancement module 100 may prevent a blocking artifact from occurring in an extracted illuminance map by generating multi-scale images with regard to an input image and iteratively performing an FGWLS based extraction operation on the generated multi-scale images by performing a multi-scale based extraction operation. According to an example embodiment, how the image signal processor 12 or the enhancement module 100 processes an image signal to enhance a contrast will be described in detail below.

Figure 3:
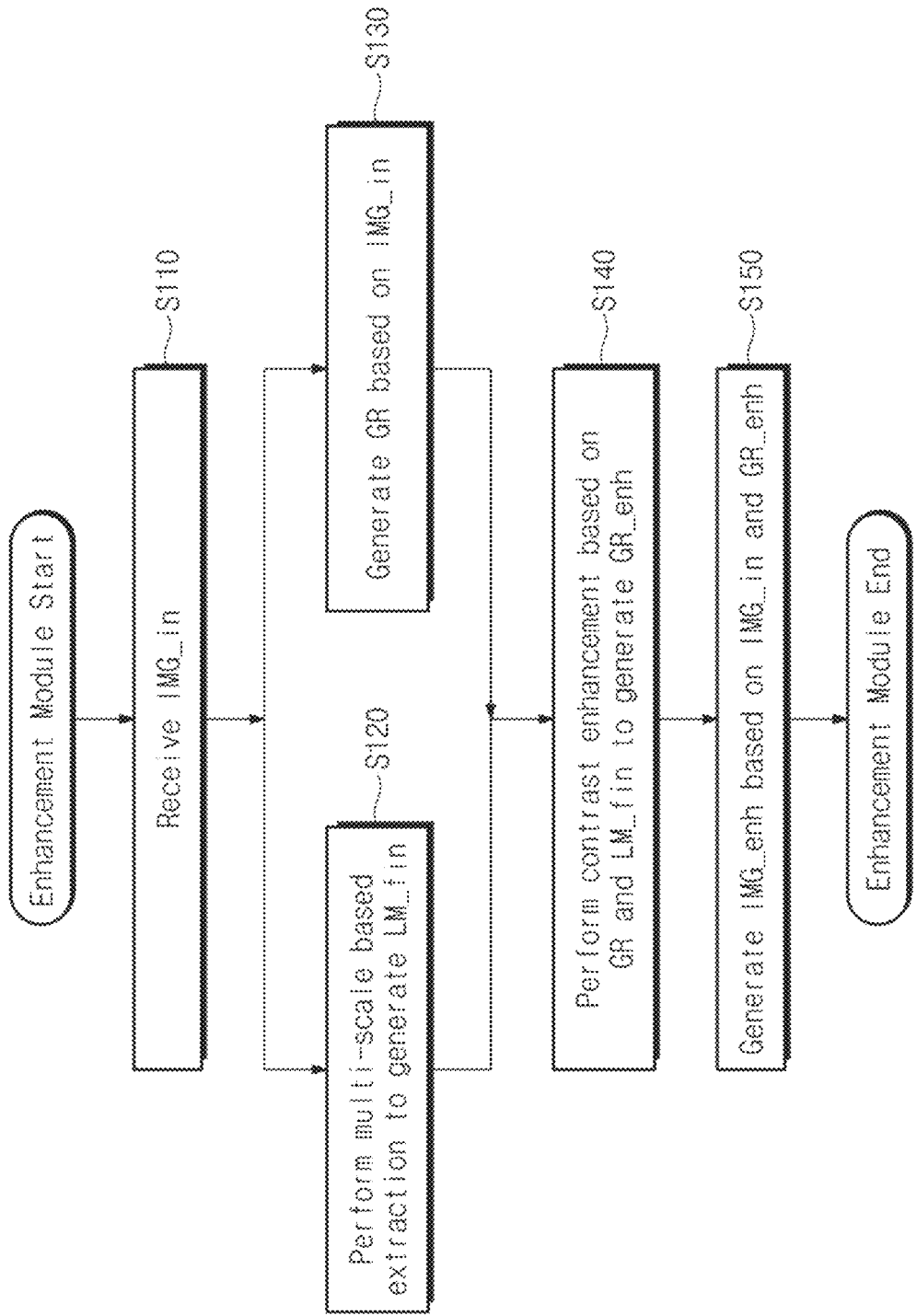
FIG. 3 is a flowchart illustrating an operation of an enhancement module of FIG. 2.

FIG. 3 is a flowchart illustrating an operation of an enhancement module 100 of FIG. 2. Performing fast global weighted least squares (FGWLS) may mean to performing FGWLS based extraction or calculation on a specific image once or during one cycle. In this case, a multi-scale based illuminance map extraction operation according to an example embodiment may be performed by iteratively performing the FGWLS on multi-scale images. For example, to perform the FGWLS may include to perform the FGWLS based extraction operation on a specific image or one of multi-scale images, and to perform the multi-scale based illuminance map extraction operation may include to iteratively perform the FGWLS based extraction operation on a plurality of images. However, embodiments are not limited thereto.

Referring to FIGS. 2 and 3, in operation S110, the enhancement module 100 may receive an input image IMG_in. An image that is input to the enhancement module 100 of the image signal processor 12 is referred to as the input image IMG_in. The input image IMG_in may be an image output from the correction module 12d, in the example embodiment of FIG. 2. The input image IMG_in may be an image output from a module placed in front of the enhancement module 100. The input image IMG_in may be an image, for example, a color-enhanced image or a gamma-enhanced image that is generated by processing, at the enhancement module 100, the input image IMG_in. For example, the input image IMG_in may be an image that has undergone image signal processing for contrast enhancement or a pre-processed image.

In operation S120, the enhancement module 100 may perform the multi-scale based extraction operation on the input image IMG_in to generate a final illuminance map LM_fin. For example, the enhancement module 100 may generate multi-scale images based on the input image IMG_in. The multi-scale images may include a plurality of images, and the plurality of images may have different resolutions. The enhancement module 100 may perform a first FGWLS on a first image of the plurality of images included in the multi-scale images and may perform a second FGWLS based on a result of the first FGWLS and a second image of the plurality of images. That is, the enhancement module 100 may perform the multi-scale based extraction operation by iteratively performing the FGWLS while transferring a result of a current FGWLS to a next FGWLS. The enhancement module 100 may output a result of the multi-scale based extraction operation, a result of iteratively performing the FGWLSs, as the final illuminance map LM_fin. Operation S120 will be more fully described with reference to drawings below.

In operation S130, the enhancement module 100 may generate a gray image GR based on the input image IMG_in. For example, the enhancement module 100 may generate the gray image GR associated with the input image IMG_in through a gray filter.

In operation S140, the enhancement module 100 may perform contrast enhancement based on the gray image GR and the final illuminance map LM_fin and may generate an enhanced gray image GR_enh.

In operation S150, the enhancement module 100 may output an enhanced image IMG_enh based on the enhanced gray image GR_enh and the input image IMG_in.

Figure 4:
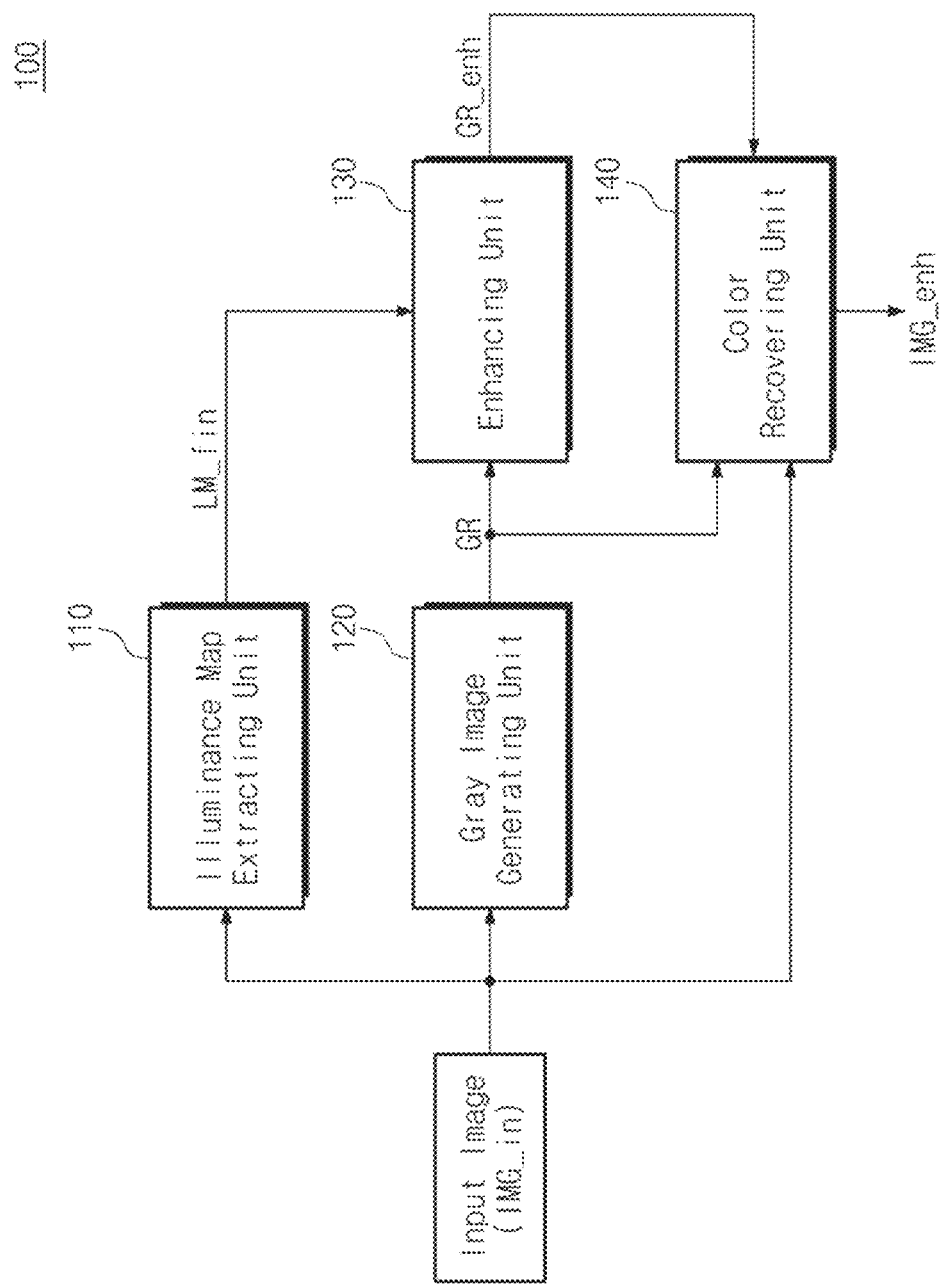
FIG. 4 is a block diagram illustrating an enhancement module of FIG. 2.

FIG. 4 is a block diagram illustrating an enhancement module 100 of FIG. 2. An operation according to the flowchart of FIG. 3, that is, image signal processing for contrast enhancement will be described with reference to FIG. 4. Referring to FIGS. 2 to 4, the enhancement module 100 may include an illuminance map extracting unit 110, a gray image generating unit 120, an enhancing unit 130, and a color recovering unit 140.

The illuminance map extracting unit 110 may generate the final illuminance map LM_fin based on the input image IMG_in. For example, the illuminance map extracting unit 110 may generate an initial illuminance map associated with the input image IMG_in. The illuminance map extracting unit 110 may generate a multi-scale image based on the initial illuminance map. The multi-scale images may include a plurality of images, and the plurality of images may have different resolutions.

The illuminance map extracting unit 110 may perform a first FGWLS on a first image having the smallest resolution from among the plurality of images included in the multi-scale image. The illuminance map extracting unit 110 may scale up a result of the first FGWLS and may perform a second FGWLS on the scaled-up result. In this case, the illuminance map extracting unit 110 may use, as a guidance image of the second FGWLS, a second image having a next smallest resolution from among the plurality of images. In an example embodiment, the guidance image may be used as an image or information for preserving an edge when the FGWLS is performed.

As described above, the illuminance map extracting unit 110 may output the final illuminance map LM_fin as a result of iteratively performing the FGWLS on the plurality of images. The illuminance map extracting unit 110 may perform the multi-scale based extraction operation. A configuration and a multi-scale based extraction operation of the illuminance map extracting unit 110 will be more fully described with reference to FIGS. 5 to 9.

The gray image generating unit 120 may generate the gray image GR associated with the input image IMG_in. For example, the gray image generating unit 120 may generate the gray image GR associated with the input image IMG_in by using a gray filter.

The enhancing unit 130 may generate an enhanced gray image GR_enh based on the final illuminance map LM_fin and the gray image GR. For example, the enhancing unit 130 may extract reflectance based on the gray image GR and the final illuminance map LM_fin. The enhancing unit 130 may perform calculation for enhancing a global contrast of an image based on the final illuminance map LM_fin and may perform calculation for enhancing a local contrast of the image based on the reflectance. The enhancing unit 130 may output the enhanced gray image GR_enh based on a result of the calculation. A configuration and an operation of the enhancing unit 130 will be more fully described with reference to FIG. 10.

The color recovering unit 140 may output an enhanced image IMG_enh by recovering a color of the enhanced gray image GR_enh based on the enhanced gray image GR_enh, the input image IMG_in, and the gray image GR. A configuration and an operation of the color recovering unit 140 will be more fully described with reference to FIG. 11.

As described above, according to an example embodiment, the image signal processor 12 or the enhancement module 100 of the image signal processor 12 may extract an illuminance map or a final illuminance map of the input image IMG_in based on the multi-scale based extraction operation. In this case, because the FGWLS is performed on each of multi-scale images generated from an input image and a result of a current FGWLS is transferred as an input of a next FGWLS, even though a flattening level used in the FGWLS decreases, the final illuminance map LM_fin having an intended flattening level may be extracted. Also, because a flattening level of the FGWLS is relatively low, a blocking artifact occurring in a conventional FGWLS, an FGWLS for a single image, may be prevented. Accordingly, a quality of a finally output image may be enhanced.

Figure 5:
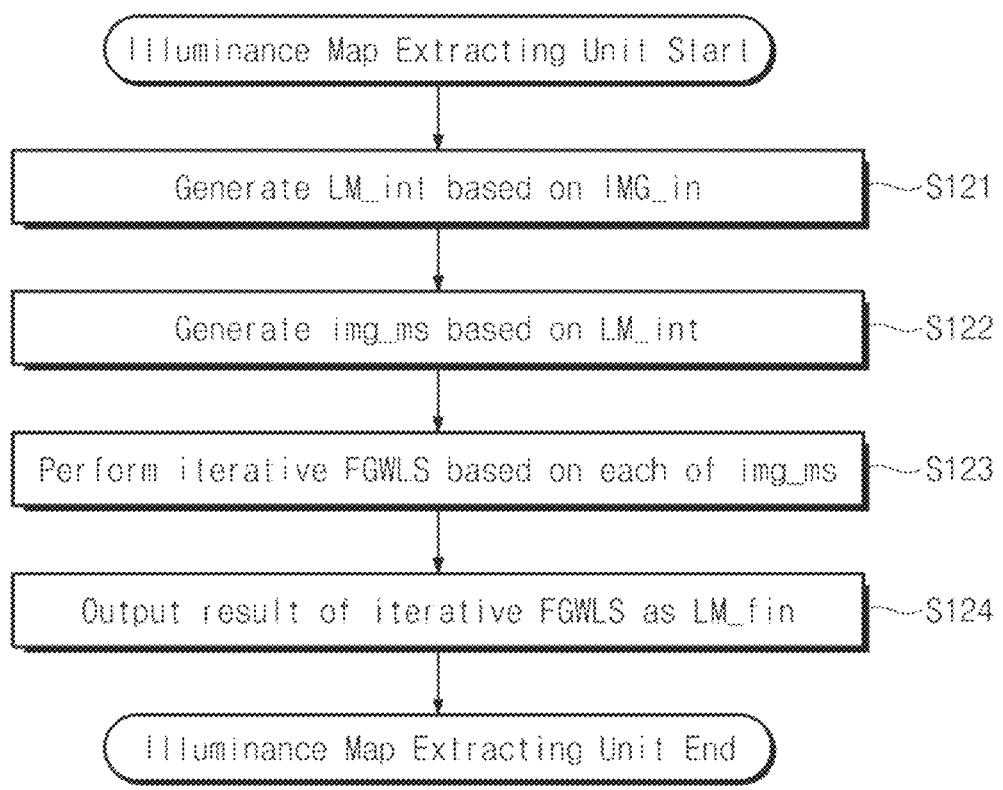
FIG. 5 is a flowchart illustrating an operation of an illuminance map extracting unit of FIG. 4.
Figure 6:
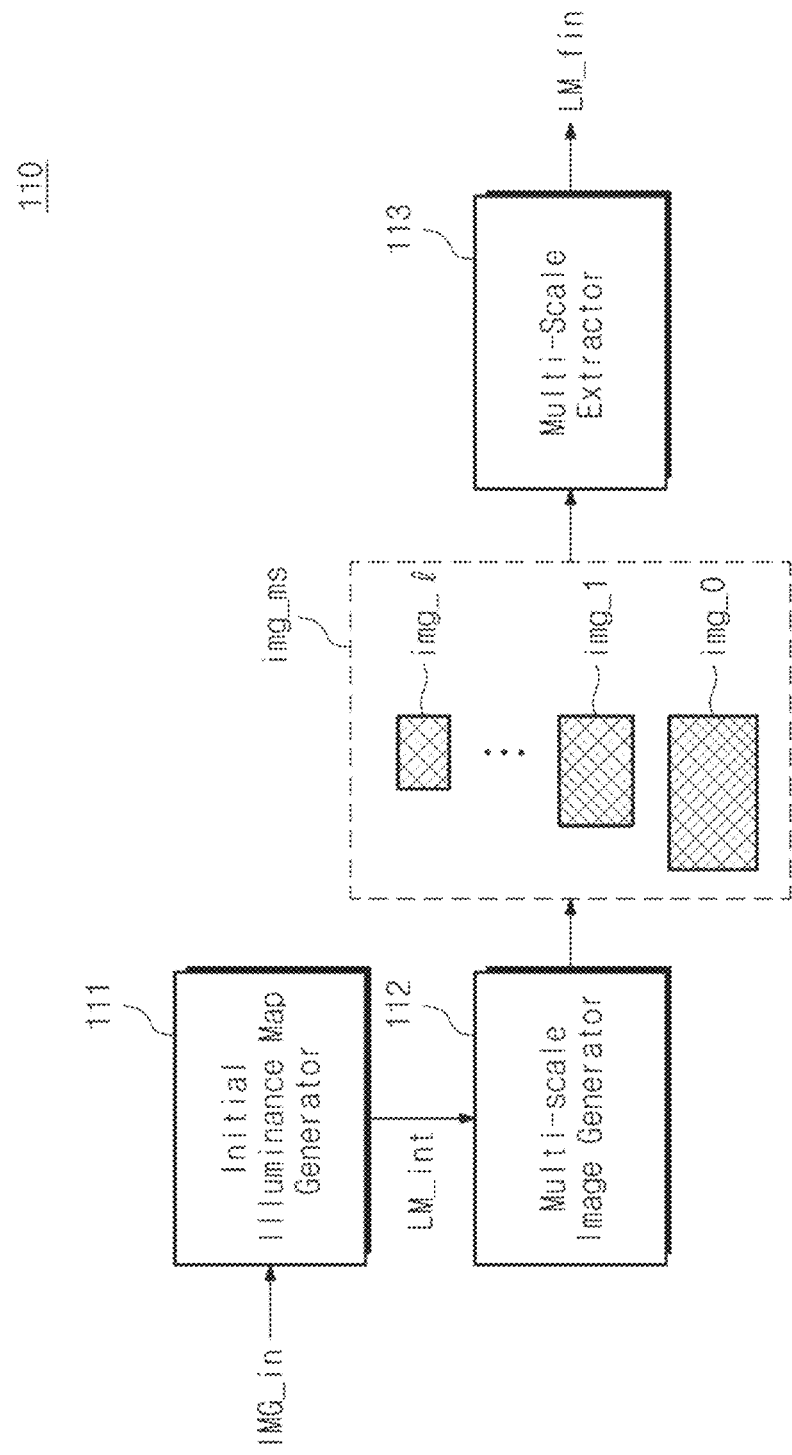
FIG. 6 is a block diagram illustrating an illuminance map extracting unit of FIG. 4.

FIG. 5 is a flowchart illustrating an operation of an illuminance map extracting unit of FIG. 4. FIG. 6 is a block diagram illustrating an illuminance map extracting unit of FIG. 4. Referring to FIGS. 4 to 6, in operation S121, the illuminance map extracting unit 110 may generate an initial illuminance map LM_int based on the input image IMG_in. For example, as illustrated in FIG. 6, an initial illuminance map generator 111 of the illuminance map extracting unit 110 may generate the initial illuminance map LM_int of the initial illuminance map LM_int, based on Equation 4 below.

$$\hat{L}(x,y)=\max[r(x,y),g(x,y),b(x,y)]$$ [Equation 4]

Referring to FIG. 4, L indicates the initial illuminance map LM_int, and r, g, and b indicate values of red, green, and blue pixels placed at coordinates of (x,y), in the input image IMG_in. In an example embodiment, it is assumed that Equation 4 above indicates a value of a hue, saturation, and value (HSV) color space and illuminance is equal to or greater than a maximum value of red, green, and blue values. In an example embodiment, the initial illuminance map LM_int may be generated based on at least one of schemes different from a scheme of Equation 4, for example, various illuminance map extraction schemes such as a low pass filter, a bilateral filter, a Gaussian filter, and a WLS.

In operation S122, the illuminance map extracting unit 110 may generate multi-scale images img_ms based on the initial illuminance map LM_int. For example, as illustrated in FIG. 6, the multi-scale image generator 112 may generate the multi-scale images img_ms based on the initial illuminance map LM_int. The multi-scale images img_ms may include a plurality of images img_0 to img_l.

The plurality of images img_0 to img_l may have different resolutions. For example, the 0-th image img_0 may be the same image as the initial illuminance map LM_int. A resolution of the 0-th image img_0 may be identical to a resolution of the initial illuminance map LM_int or a resolution of the input image IMG_in. The first image img_1 may be an image obtained by scaling down or down-sampling the 0-th image img_0 as much as n times (n being a positive integer more than 1 or a positive real number more than 1). The first image img_1 may be smaller in size than the 0-th image img_0. A resolution of the first image img_1 may be lower than a resolution of the 0-th image img_0. The l-th image img_l may be an image obtained by scaling down or down-sampling the 0-th image img_0 as much as $n^l$ times. In an example embodiment, the l-th image img_l of the multi-scale images img_ms may be an image having the lowest resolution or the smallest size. For example, the multi-scale image generator 112 may generate the multi-scale image img_ms by iteratively scaling down the initial illuminance map LM_int as much as n times.

In operation S123, the illuminance map extracting unit 110 may iteratively perform the FGWLS based on the multi-scale images img_ms. The illuminance map extracting unit 110 may perform the multi-scale based illuminance map extraction operation. For example, as illustrated in FIG. 6, a multi-scale extractor 113 may iteratively perform the FGWLS on the plurality of images img_0 to img_l included in the multi-scale image img_ms. Operation S123 will be more fully described with reference to FIGS. 7 to 8B.

In operation S124, the illuminance map extracting unit 110 may output the final illuminance map LM_fin as a result of iteratively performing the FGWLS, a result of the multi-scale based illuminance map extraction operation.

A conventional FGWLS may generate a final illuminance map by processing a single image having a single resolution. In this case, when a flattening level for calculation exceeds a specific value or a size of a single image is large, a blocking artifact may occur in a final illuminance map.

In contrast, as described above, the image signal processor 12 or the enhancement module 100 according to an example embodiment may generate the final illuminance map LM_fin by iteratively performing the FGWLS on a plurality of images, the multi-scale images img_ms, having different resolutions. In this case, the enhancement module 100 may prevent a blocking artifact from occurring in the final illuminance map LM_fin by using a relatively low flattening level. In addition, because a result of performing the FGWLS on an image having a low resolution is used as an input of a next FGWLS, the FGWLS for an image a next resolution, even though a relatively low flattening level is used, an intended flattening strength may be obtained from the final illuminance map LM_fin.

Figure 7:
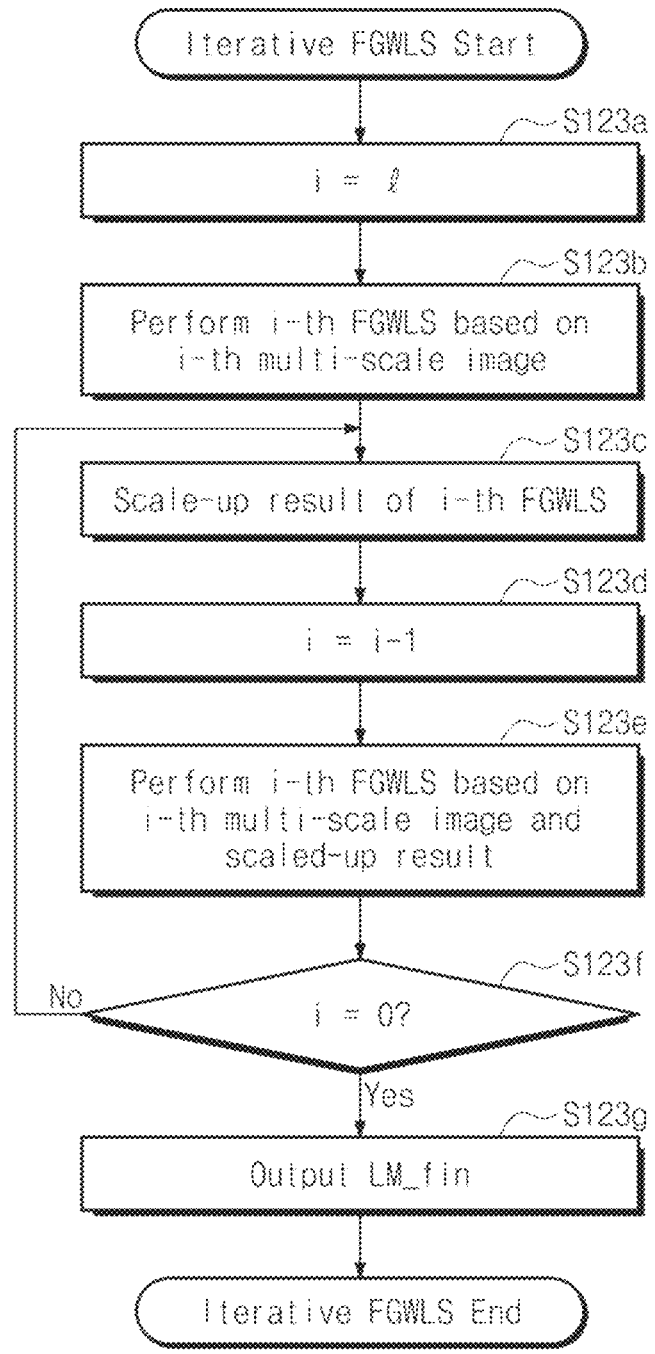
FIG. 7 is a flowchart illustrating operation S123 of FIG. 5.

FIG. 7 is a flowchart illustrating operation S123 of FIG. 5. Referring to FIGS. 5 to 7, operation S123 may include operation S123a to operation S123g.

In operation S123a, a variable i is set to 1. In an example embodiment, the variable i is only for describing an iterative operation of the multi-scale FGWLS, and embodiments are not limited thereto. Here, l may be a reference numeral corresponding to an image having the smallest resolution from among the plurality of images img_0 to img_l included in the multi-scale image img_ms. In an example embodiment, l may be an integer greater than 2. For example, l may be "3".

In operation S123b, the multi-scale extractor 113 may perform an i-th FGWLS based on an i-th multi-scale image. The multi-scale extractor 113 may perform an l-th image imag_l having the smallest resolution from among the plurality of images img_0 to img_l included in the multi-scale image img_ms. In an example embodiment, in an l-th FGWLS operation, the l-th image img_l may be used as a guidance image. In a first FGWLS operation, in an i-th FGWLS operation, the l-th image img_l may be used as an input image and a guidance image.

In operation S123c, the multi-scale extractor 113 may scale up or enlarge a result of operation 123b, a result of the i-th FGWLS. In this case, the multi-scale extractor 113 may enlarge the result of operation 123b, the result of the i-th FGWLS, as much as n times. In an example embodiment, n may correspond to a reduction radio used to generate the multi-scale images img_ms.

In operation S123d, the variable i is set to i−1.

In operation S123e, the multi-scale extractor 113 may perform the i-th FGWLS based on the scaled-up result, a result of operation S123c, and an i-th multi-scale image img_i. For example, the multi-scale extractor 113 may perform the i-th FGWLS by using the scaled-up result, a result of operation S123c, as an input and the i-th multi-scale image img_i as a guidance image.

In operation S123f, whether the variable i is 0 is determined. When it is determined that the variable i is not 0, the multi-scale extractor 113 again performs operation S123c. That is, the multi-scale extractor 113 may perform the FGWLS operation on an image having a next resolution, a resolution higher than a resolution of an (l−1)-th image img_l−1. In other words, a result of the FGWLS associated with a current resolution may be transferred or used as an input of the FGWLS associated with a next resolution which is a higher resolution.

When it is determined that the variable i is 0, in operation S123g, the multi-scale extractor 113 may output the final illuminance map LM_fin as a result of iteratively performing the FGWLS.

As described above, the illuminance map extracting unit 110 according to an example embodiment may extract the final illuminance map LM_fin by performing the FGWLS operation on each of multi-scale images having different resolutions.

In an example embodiment, the weighted least squares (WLS) may be performed on a specific image, based on Equation 5 below.

$$J(L) = \sum_p (\hat{L}_p - L_p)^2 + \lambda_a ( \sum_{q \in N(p)} w_{p,q}(G)(L_p - L_q)^2 )) \quad \text{[Equation 5]}$$

Referring to Equation 5 above, p=(x,y) indicates a location of a pixel of a specific image, and (p) indicates pixels adjacent a p pixel. $w_{p,q}(G)$ is a function for calculating a similarity weight between two pixels p and q from a guidance image. $\lambda_a$ is a weight to be applied to a pixel similarity condition of $L_p$. As described above, the fast global weighted least square (FGWLS) may indicate a way to calculate by simplifying an optimal solution of the WLS that is based on Equation 5 above and may flatten a specific image by iteratively performing calculation on the sparse Laplacian matrix in units of a row and in units of a column. The multi-scale FGWLS operation according to the flowchart of FIG. 7 of the inventive concept may be performed based on Equation 6 below.

[Equation 6]
$$L^i(x, y) = \begin{cases} FGWLS(\uparrow_n (L^{i+1}(x, y)), G^i(x, y), \lambda^i, T^i), & i = 0, \ldots, l-1 \\ FGWLS(\hat{L}^i(x, y), G^i(x, y), \lambda^i, T^i), & i = l \end{cases}$$

Referring to Equation 6 above, FGWLS indicates an operation function to simplify and calculate an optimal solution of the WLS that is based on Equation 5 above, $\uparrow_n$ indicates a function to scale up or enlarge an input image as much as n times, $L^i$ indicate a result of an i-th FGWLS, $G^i$ indicates a guidance image used in the i-th FGWLS, $\lambda^i$ indicates a flattening level used in the i-th FGWLS, and $T^i$ indicates the number of times that calculation for each row and for each column used in the i-th FGWLS is repeated. The remaining reference signs are described above.

A guidance image of $G^i$ may correspond to one of a plurality of images included in the multi-scale image img_ms. That is, a 0-th guidance image of $G^0$ may correspond the 0-th image img_0 or the initial illuminance map LM_int. A first guidance image of $G^1$ may correspond to the first image img_1 obtained by scaling down the 0-th image img_0 as much as n times. That is, an i-th guidance image of $G^i$ and an input image of L may be determined by scaling down or reducing the initial illuminance map LM_int (i.e., $L^0$) or the 0-th image img_0 as much as $n^i$ times.

As illustrated in FIG. 7, the multi-scale FGWLS operation may be sequentially performed from the l-th image img_l having the lowest resolution to the 0-th image img_0 having the highest resolution. A result of a current FGWLS may be used or transferred as an input of a next FGWLS. Accordingly, even though there is used a flattening level of $\lambda^i$, which has a relatively small value, an intended result may be obtained from the final illuminance map LM_fin. Also, because there is used a flattening level of $\lambda^i$, which has a relatively small value, a block artifact may be prevented from occurring in the final illuminance map LM_fin. Also, because results of processing images of various resolutions are combined, there may be an advantage in terms in dynamic range compression (DRC) and tonal rendition.

In an example embodiment, to perform the multi-scale based extraction operation according to an example embodiment, it may be necessary to define $w_{p,q}$ being a function to calculate a similarity weight between two pixels. In the multi-scale based extraction operation according to an example embodiment, $w_{p,q}$ may be defined based on a gradient of a guidance image, as expressed by Equation 7 below.

$$w_{p,q}(G)=(|G_p-G_q|^\alpha+\beta)^{-1} \quad \text{[Equation 7]}$$

Referring to Equation 7 above, α and β are variables for adjusting a magnitude of a similarity according to a gradient of a guidance image. The remaining reference signs are described above. In an example embodiment, α and β may be respectively set to 1.32 and 0.001. However, embodiments are not limited thereto. For example, α and β may be variables determined experimentally and may be set to various values depending on a way to implement an image signal processor and an image quality.

Figure 8A:
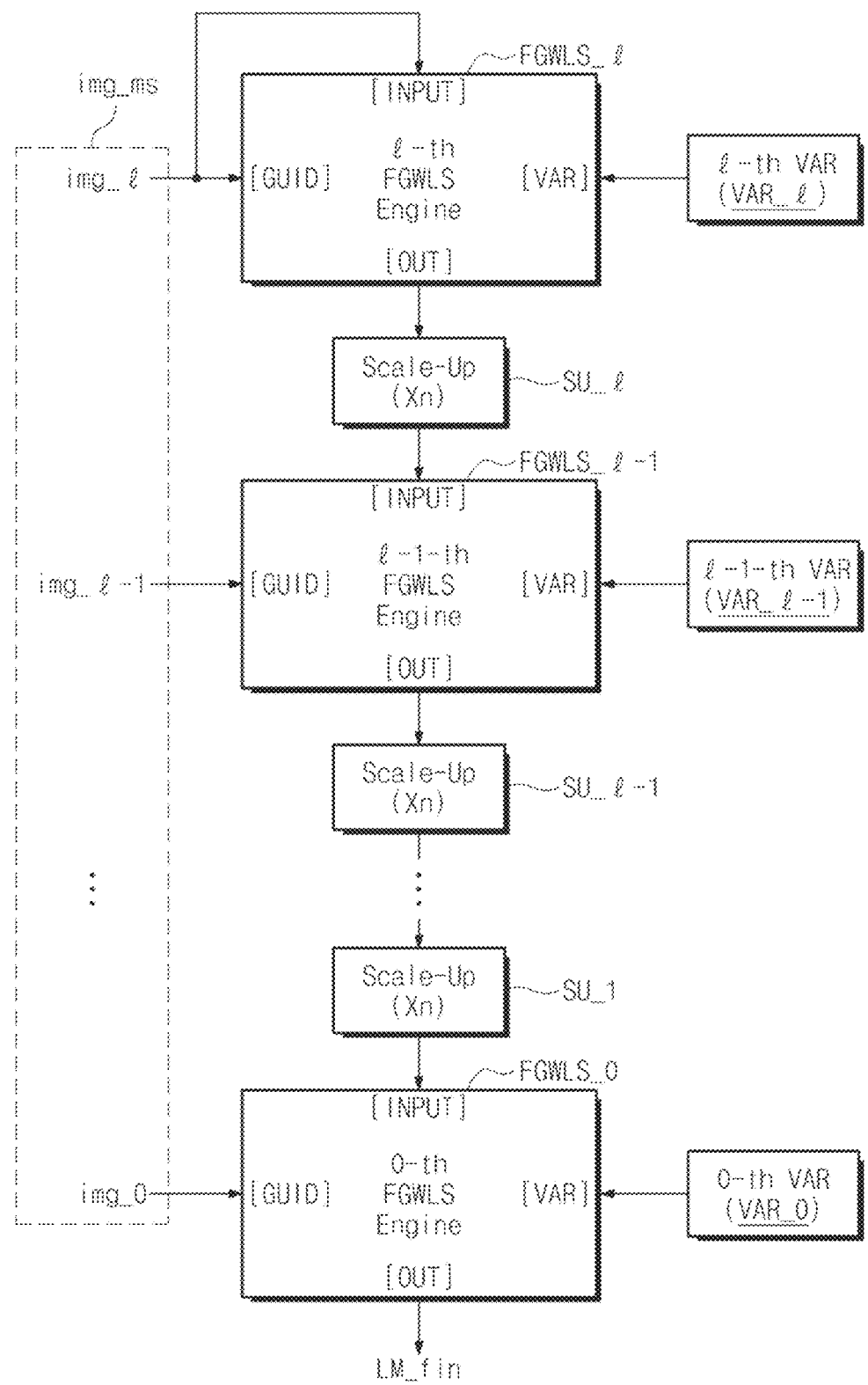
FIGS. 8A and 8B are block diagrams illustrating a multi-scale FGWLS of FIG. 6.
Figure 8B:
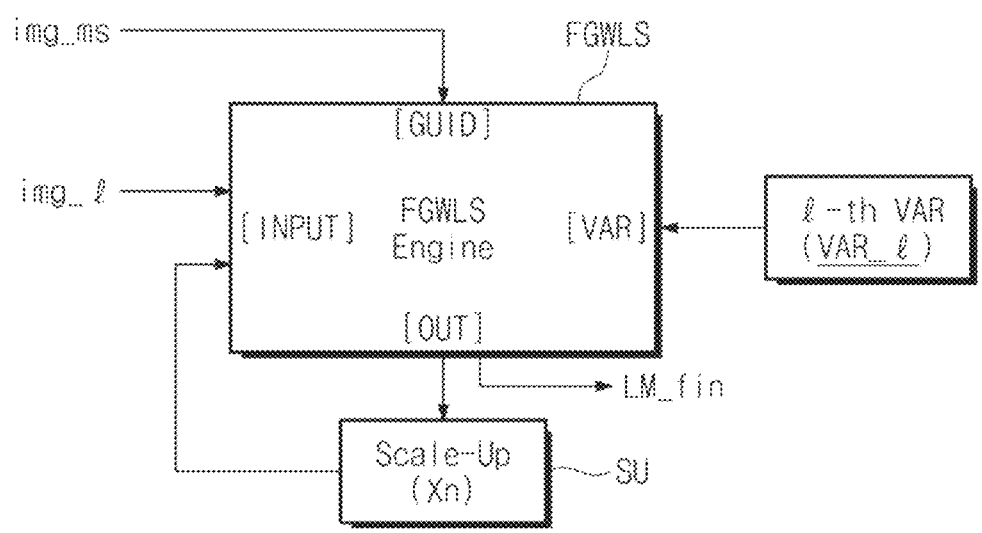

FIGS. 8A and 8B are block diagrams illustrating a multi-scale FGWLS of FIG. 6. Referring to FIGS. 6 and 8A, the multi-scale extractor 113 may include a plurality of FGWLS engines FGWLS_0 to FGWLS_l, a plurality of scale-up engines SU_1 to SU_l, and a plurality of variable engines VAR_0 to VAR_l.

The l-th FGWLS engine FGWLS_l from among the plurality of FGWLS engines FGWLS_0 to FGWLS_l may receive the l-th image img_l, for example, an image having the smallest resolution of the multi-scale images img_ms as an input INPUT and a guidance image GUID and may receive corresponding variables from the l-th variable engine VAR_l. The l-th FGWLS engine FGWLS_l may perform the FGWLS operation based on Equation 6 above. In this case, because the variable i is l, each of $\hat{L}^i$ and $G^i$ may be the l-th image img_1, and $\lambda^i$ and $T^i$ may be set by the l-th variable engine VAR_l. A result, an output OUT, of the l-th FGWLS engine FGWLS_l is provided to the l-th scale-up engine SU_l.

The l-th scale-up engine SU_l may enlarge or scale up the output OUT of the l-th FGWLS engine FGWLS_l as much as n times. In this case, n may correspond to a reduction ratio of the multi-scale images img_ms. An output, the scaled-up result, of the l-th scale-up engine SU_l is provided to the (l−1)-th FGWLS engine FGWLS_l−1.

The (l−1)-th FGWLS engine FGWLS_l−1 may receive the output, the scaled-up result, of the l-th scale-up engine SU_l as an input INPUT and may receive the (l−1)-th image img_l−1 of the multi-scale images img_ms as the guidance image GUID. In this case, a resolution of the output, the scaled-up result, of the l-th scale-up engine SU_l may be identical to a resolution of the (l−1)-th image img_l−1. The (l−1)-th FGWLS engine FGWLS_l−1 may receive corresponding variables from the (l−1)-th variable engine VAR_l−1.

The (l−1)-th FGWLS engine FGWLS_l−1 may perform the FGWLS operation based on Equation 6 above. In this case, because the variable i is l−1, $L^{i+1}$ may be an output OUT of the l-th FGWLS engine FGWLS_l. That is, $\uparrow_n(L^{i+1})$ may be an output of the l-th scale-up engine SU_l. $G^i$ may be the (l−1)-th image img_l−1, and $\lambda^i$ and $T^i$ may be set by the (l−1)-th variable engine VAR_l. A result, an output OUT, of the (l−1)-th FGWLS engine FGWLS_l−1 is provided to the (l−1)-th scale-up engine SU_l−1.

The (l−1)-th scale-up engine SU_l−1 may enlarge or scale up the output OUT of the (l−1)-th FGWLS engine FGWLS_l−1 as much as n times, and the scaled-up result may be provided to a next FGWLS engine (e.g., the (l−2)-th FGWLS engine.

Each of the plurality of FGWLS engines FGWLS_0 to FGWLS_l may perform the above FGWLS operation, and each of the plurality of scale-up engines SU_0 to SU_l may perform the above scale-up operation. The 0-th FGWLS engine FGWLS_0 of the plurality of FGWLS engines FGWLS_0 to FGWLS_l may receive a scaled-up result from the first scale-up engine SU_1 as the input INPUT, may receive the 0-th image img_0 of the multi-scale images img_ms as the guidance image GUID, and may receive variable information from the 0-th variable engine VAR_0. As in the above description, the 0-th FGWLS engine FGWLS_0 may perform the FGWLS operation based on the Equation 6 above, and a result of the 0-th FGWLS engine FGWLS_0 may be output as the final illuminance map LM_fin.

Referring to FIGS. 6 and 8B, the multi-scale extractor 113 may include a FGWLS engine FGWLS, a variable engine VAR, and a scale-up engine SU. The FGWLS engine FGWLS may perform the multi-scale based extraction operation based on Equation 6 above. For example, as in the above description, the FGWLS engine FGWLS may receive the l-th image img_l as the input INPUT, may receive a corresponding image, the l-th image img_l, of the multi-scale images img_ms as the guidance image GUID, and may receive a corresponding variable from the variable engine VAR. The FGWLS engine FGWLS may perform the FGWLS operation, which is based on Equation 6 above, by using the pieces of received information. A result of the FGWLS engine FGWLS may be provided to the scale-up engine SU, and the scale-up engine SU may scale up the input result and may provide the scaled-up result as the input INPUT of the FGWLS engine FGWLS.

Afterwards, the FGWLS engine FGWLS may perform the FGWLS operation on the scaled-up result and the multi-scale image img_ms, based on Equation 6 above. A result of performing the FGWLS operation on the 0-th image img_0 having the highest resolution from among the multi-scale images img_ms may be output as the final illuminance map LM_fin.

As described with reference to FIG. 8A, the multi-scale extractor 113 according to an example embodiment may have a pipeline structure in which a plurality of FGWLS operations are sequentially performed. As described with reference to FIG. 8B, the multi-scale extractor 113 according to an example embodiment may have a feedback structure in which a result of the FGWLS operation is fed back as an input. However, embodiments are not limited thereto. For example, the multi-scale FGWLS according to an embodiment may be variously changed or modified.

As described above, compared to a conventional FGWLS scheme associated with a single resolution, an illuminance map extraction scheme using the multi-scale FGWLS according to an example embodiment may prevent a blocking artifact. Also, because the FGWLS is performed through a plurality of steps and a current FGWLS result is transferred to a next FGWLS input, there may be an advantage in terms in dynamic range compression (DRC) and tonal rendition.

Figure 9:
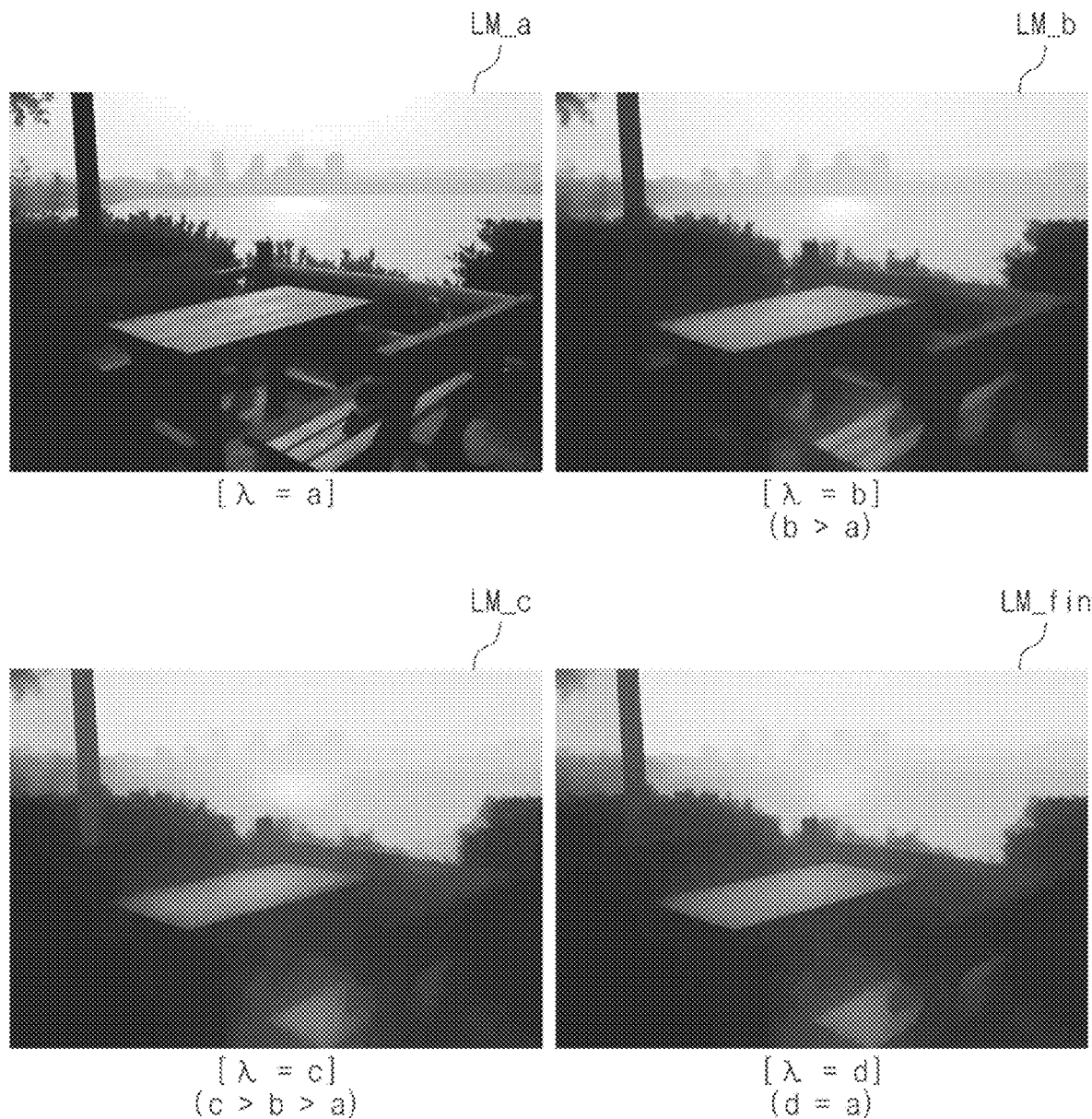
FIG. 9 is a diagram for describing an example effect according to an operation of an illuminance map extracting unit of FIGS. 6 to 8B.

FIG. 9 is a diagram for describing an example effect according to an operation of an illuminance map extracting unit of FIGS. 6 to 8B. Referring to FIG. 9, a first illuminance map LM_a, a second illuminance map LM_b, and a third illuminance map LM_c may be illuminance maps extracted by a conventional FGWLS for a single image, and the final illuminance map LM_fin may be an illuminance map extracted by the illuminance map extracting unit 110 according to an example embodiment.

The first illuminance map LM_a may be an illuminance map extracted by the conventional FGWLS in which the flattening level $\lambda$ is set to a, the second illuminance map LM_b may be an illuminance map extracted by the conventional FGWLS in which the flattening level $\lambda$ is set to b (b being greater than a), and the third illuminance map LM_c may be an illuminance map extracted by the conventional FGWLS in which the flattening level $\lambda$ is set to c (c being greater than b). As illustrated in FIG. 9, according to the conventional FGWLS, as the flattening level $\lambda$ increases, a flattening strength in an illuminance map may become stronger. However, like the first illuminance map LM_a, in the case where the flattening level $\lambda$ is relatively small, an intended flattening strength may not appear at the extracted illuminance map. Also, like the third illuminance map LM_c, in the case where the flattening level $\lambda$ is relatively great, a blocking artifact may occur in a specific region.

In contrast, even though the flattening level $\lambda_i$ of each FGWLS is set to d (for example, d=a) being a relatively small value, an intended flattening strength may appear at the final illuminance map LM_fin extracted through the multi-scale based extraction operation according to an example embodiment. Also, because the flattening level $\lambda_i$ is relatively small, a block artifact may be prevented from occurring in the final illuminance map LM_fin.

Figure 10:
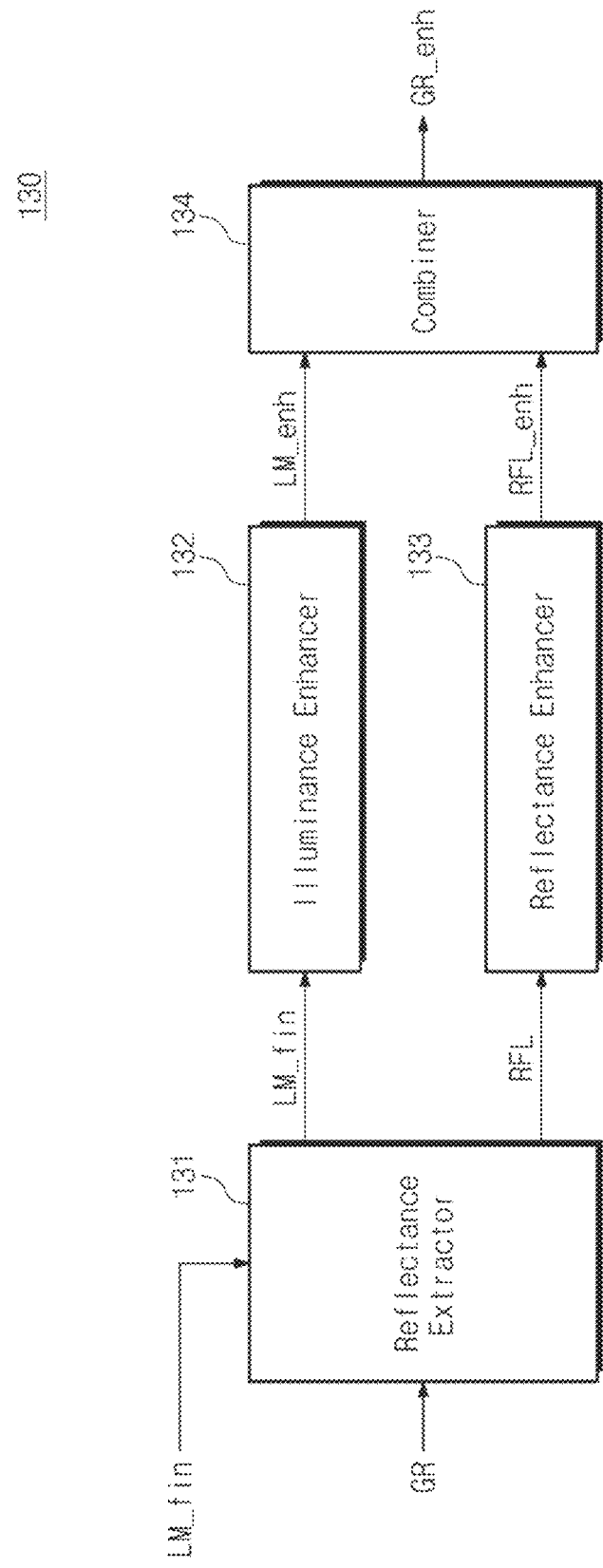
FIG. 10 is a block diagram illustrating an enhancing unit of FIG. 4.

FIG. 10 is a block diagram illustrating an enhancing unit of FIG. 4. Referring to FIGS. 4 and 10, the enhancing unit 130 may perform signal processing based on the gray image GR and the final illuminance map LM_fin and may generate the enhanced gray image GR_enh. For example, the enhancing unit 130 may include a reflectance extractor 131, an illuminance enhancer 132, a reflectance enhancer 133, and a combiner 134.

The reflectance extractor 131 may extract reflectance RFL from the gray image GR based on the final illuminance map LM_fin. For example, as described with reference to Equation 1 above, a specific image may be expressed by reflectance and illuminance. In the case where information, for example, the gray image GR about the specific image and information, for example, the final illuminance map LM_fin about illuminance are obtained, the reflectance RFL may be extracted based on Equation 1 above. The final illuminance map LM_fin may be provided to the illuminance enhancer 132, and the reflectance RFL may be provided to the reflectance enhancer 133.

The illuminance enhancer 132 may enhance a contrast of the final illuminance map LM_fin. For example, the illuminance enhancer 132 may enhance the contrast of the final illuminance map LM_fin based on a gamma function. The gamma function may be expressed by Equation 8 below.

$$L^{enh} = L^{\gamma} \qquad \text{[Equation 8]}$$

Referring to Equation 8 above, $L^{enh}$ may indicate the enhanced illuminance map LM_enh being information obtained by enhancing the brightness and contrast of the final illuminance map LM_fin, and $\gamma$ may indicate a gamma value. Brightness of a dark portion of the final illuminance map LM_fin may be adjusted depending on $\gamma$.

The illuminance enhancer 132 may enhance the contrast of the final illuminance map LM_fin based on a windowed inverse sigmoid (WIS) function. The WIS function may be a function that is used to secure a dynamic region of a result value by increasing brightness of a dark portion of the final illuminance map LM_fin and simultaneously decreasing brightness of a bright portion of the final illuminance map LM_fin. The WIS function may be expressed by Equation 9 below.

$$f(v) = \frac{1}{1 + e^{-av}} \qquad \text{[Equation 9]}$$

$$L_n = \frac{L}{255}$$

$$L_n = L_n[f(v_{max}) - f(v_{min})] + f(v_{min})$$

$$L_n = \frac{1}{a}\ln\left(\frac{1}{L_n} - 1\right)$$

$$L^{enh} = 255\left(\frac{L_n - v_{min}}{v_{max} - v_{min}}\right)$$

Referring to Equation 9 above, $f$ may indicate a sigmoid function, L may indicate the final illuminance map LM_fin, $v_{max}$ and $v_{min}$ may be variables for deciding a shape of the WIS. The increment of brightness of the dark portion of the enhanced illuminance map LM_enh and the decrement of brightness of the bright portion of the enhanced illuminance map LM_enh may be adjusted depending on $v_{max}$ and $v_{min}$.

In an example embodiment, how the illuminance enhancer 132 enhances a contrast of an illuminance map is described with reference to Equation 8 or Equation 9 above, but embodiments are not limited thereto. For example, the illuminance enhancer 132 may use various function models or various image signal processing techniques for the purpose of enhancing a global contrast of an input image.

The reflectance enhancer 133 may output the enhanced reflectance RFL_enh by enhancing a contrast, for example, a local contrast of the reflectance RFL. The final illuminance map LM_fin may mainly include a low-frequency component and may include only a portion of a high-frequency component corresponding to the reflectance RFL. In this case, in the case where calculation for contrast enhancement is performed on the final illuminance map LM_fin, a value of the high-frequency component or a reflectance component included in the final illuminance map LM_fin may be changed through non-linear conversion, thereby decreasing the whole definition of an image. To prevent this issue, the reflectance enhancer 133 may prevent the definition of a final image from decreasing by enhancing a local contrast of the reflectance RFL. For example, the reflectance enhancer 133 may enhance the contrast of the reflectance RFL based on Equation 10 below.

$$R = \frac{F(x, y)}{L(x, y)}$$

$$F(x, y) = \frac{1}{3}(r(x, y) + g(x, y) + b(x, y))$$

$$R^{enh} = R^P(x, y) = \left(\frac{F(x, y)}{L(x, y)}\right)^P$$

[Equation 10]

Referring to Equation 10 above, R may indicate the extracted reflectance RFL, F may indicate the final illuminance map LM_fin, $R^{enh}$ may indicate the enhanced reflectance RFL_enh, and P may be a variable for enhancing a local contrast. Here, it is assumed that P is a number greater than 1. In the case where F(x,y) being a value of a center pixel is greater than L(x,y) being an average of values of surrounding pixels, $R^{enh}$ may become greater than R, if not, $R^{enh}$ may become smaller than R. That is, a local contrast may be enhanced by making the value of the center pixel more brightly when the center pixel is relatively bright and making the value of the center pixel more dark when the center pixel is relatively dark. In an example embodiment, L in Equation 10 above may be replaced with the enhanced illuminance map LM_enh.

The combiner 134 may output the enhanced gray image GR_enh based on the enhanced illuminance map LM_enh and the enhanced reflectance RFL_enh. For example, as described with reference to Equation 1 above, a specific image may be expressed by information about illuminance and information about reflectance. That is, the combiner 134 may generate the enhanced gray image GR_enh by combining the enhanced illuminance map LM_enh and the enhanced reflectance RFL_enh based on Equation 1 above.

In an example embodiment, the combiner 134 may be configured to reduce a noise of the enhanced gray image GR_enh. For example, in the case where the brightness or contrast of a dark region in an image is enhanced, a noise present in the dark region may be amplified together. To reduce the above noise, the combiner 134 may combine the enhanced illuminance map LM_enh and the enhanced reflectance RFL_enh based on Equation 11 below.

$$F^{enh} = (R^{enh}(x, y) \times L_n^{enh}(x, y)) + (R_d(x, y) \times (1 - L_n^{enh}(x, y)))$$ [Equation 11]

Referring to Equation 11 above, $R^{enh}$ may indicate the enhanced reflectance RFL_enh, and $L_n^{enh}$ may be a result of normalizing $L^{enh}$ being the enhanced reflectance RFL_enh with a value of [0,1]. $R_d$ may indicate a result of flattening $R^{enh}$ through the FGWLS. In an example embodiment, the FGWLS that is performed on $R^{enh}$ may be performed based on the multi-scale FGWLS described with reference to FIGS. 6 to 9. The FGWLS that is performed on $R^{enh}$ may be performed based on a conventional FGWLS.

As expressed by Equation 11, the suppression or reduction of a noise in a dark region is performed depending on a linear combination of $R_d$ and $R^{enh}$, with reference to $L_n^{enh}$. The reason is that a magnitude of a noise is not uniform in the whole region of an image and is adaptively processed depending on a brightness value. In the case of a bright region of an image, a pixel value is determined based on $R^{enh}$, and in the case of a dark region of the image, a pixel value is determined based on based on information obtained by flattening a noise of $R_d$. As described above, the enhanced gray image GR_enh in which a noise amplified in a specific region, for example, a dark portion of an image, is suppressed through Equation 11 above may be output.

Figure 11:
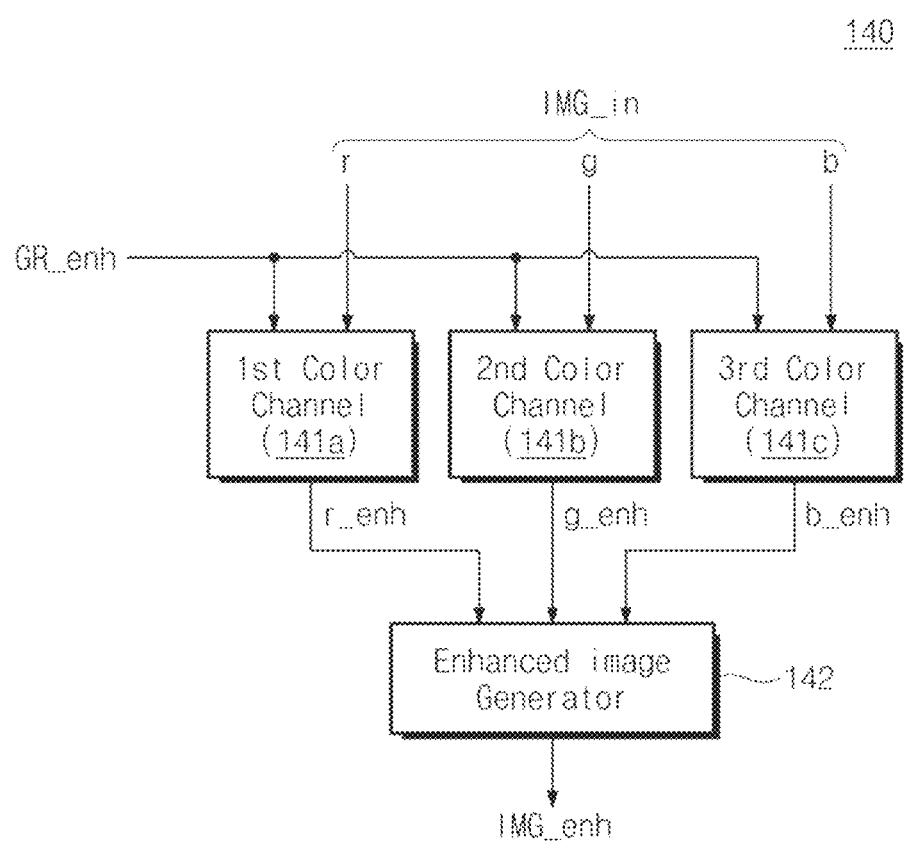
FIG. 11 is a block diagram illustrating a color recovering unit of FIG. 4.

FIG. 11 is a block diagram illustrating a color recovering unit of FIG. 4. Referring to FIG. 11, the color recovering unit 140 may generate the enhanced gray image GR_enh based on the input image IMG_in and the enhanced gray image GR_enh. For example, the color recovering unit 140 may include first to third color channel engines 141a to 141c and an enhanced image generator engine 142.

The first color channel engine 141a, the second color channel engine 141b, and the third color channel engine 141c may respectively generate enhanced color information r_enh, g_enh, and b_enh based on corresponding color information r, g, and b from the input image IMG_in and corresponding information of the enhanced gray image GR_enh. For example, the first color channel engine 141a, the second color channel engine 141b, and the third color channel engine 141c may generate the enhanced color information r_enh, g_enh, and b_enh, respectively, based on Equation 12 below.

$$r^{enh} = \frac{F^{enh}}{F}r$$

$$g^{enh} = \frac{F^{enh}}{F}g$$

$$b^{enh} = \frac{F^{enh}}{F}b$$

[Equation 12]

Referring to Equation 12 above, r, g, and b indicate color information obtained from the input image IMG_in, $F^{enh}$ indicates information corresponding to the enhanced gray image GR_enh, F indicates information corresponding to the gray image GR generated by the gray image generator 120 as shown in FIG. 4, an image before a contrast is enhanced, and $r^{enh}$, $g^{enh}$, and $b^{enh}$ indicate enhanced color information about red, green, and blue colors, respectively.

The enhanced image generator engine 142 may combine the enhanced color information r_enh, g_enh, and b_enh generated based on Equation 12 above and may generate the enhanced image IMG_enh.

As described above, according to an example embodiment, the image signal processor 12 or the enhancement module 100 of the image signal processor 12 may generate multi-scale images associated with an input image and may perform a multi-scale FGWLS operation on the multi-scale images. In this case, a blocking artifact occurring in a conventional FGWLS may be prevented. Accordingly, an image quality may be enhanced. As such, the image signal processor 12 having enhanced reliability and enhanced performance is provided.

Figure 12A:
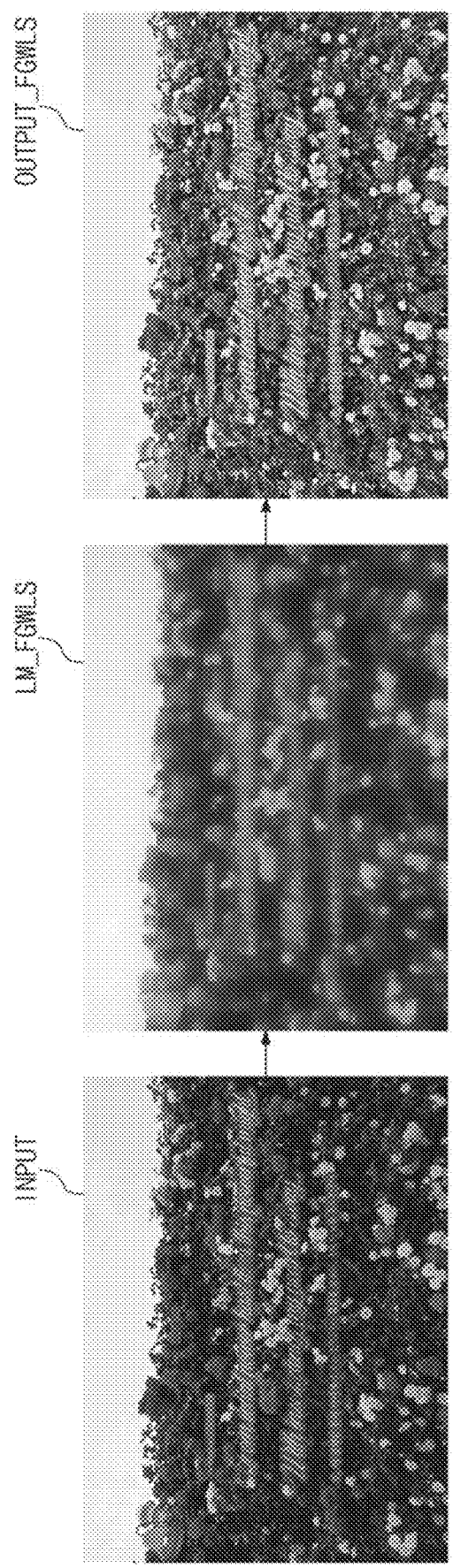
FIGS. 12A and 12B are diagrams for describing an example effect according to an example embodiment.
Figure 12B:
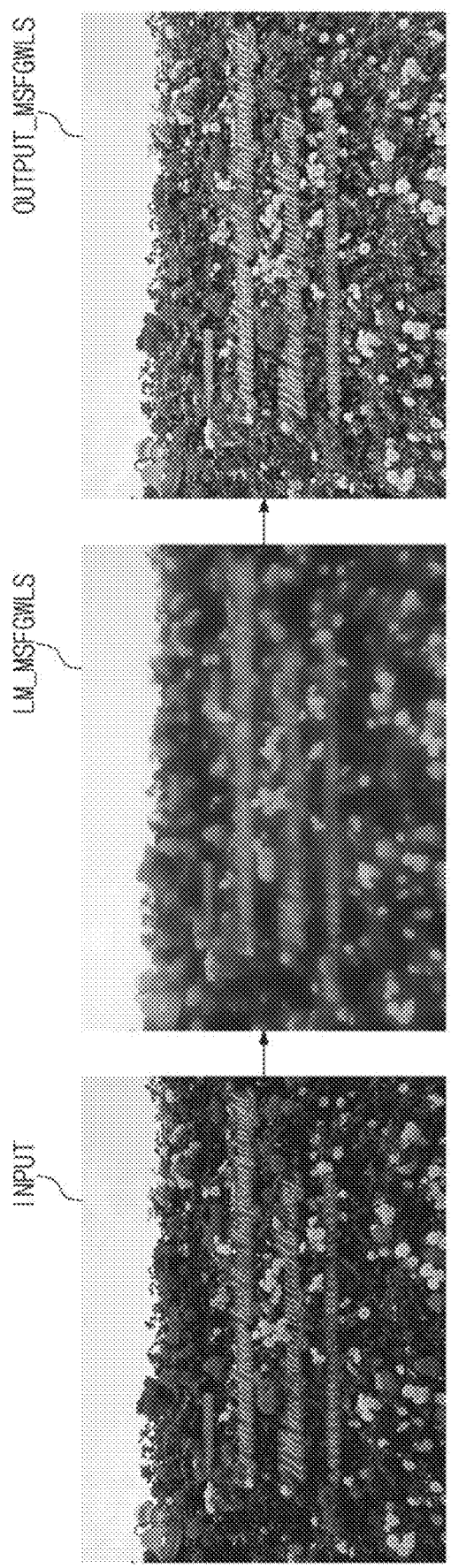

FIGS. 12A and 12B are diagrams for describing an example effect according to an example embodiment. An illuminance map and an output image that are obtained by performing a conventional FGWLS for a single image on an input image INPUT will be described with reference to FIG. 12A, and an illuminance map and an output image that are obtained by performing an MSFGWLS, an FGWLS for a multi-scale image, according to an example embodiment on the input image INPUT will be described with reference to FIG. 12B.

An illuminance map LM_FGWLS that is obtained by performing the conventional FGWLS on the input image INPUT is illustrated in FIG. 12A. As understood from the illuminance map LM_FGWLS of FIG. 12A, a blocking artifact may occur in some regions. In contrast, an illuminance map LM_MSFGWLS that is obtained by performing the MSFGWLS according to an example embodiment on the input image INPUT is illustrated in FIG. 12B, and blocking artifacts occurring in the illuminance map LM_FGWLS of FIG. 12A may be reduced.

For example, referring to the illuminance map LM_FGWLS having undergone the conventional FGWLS, blocking artifacts may occur in regions of the input image INPUT, in which, for example, red roses are located. In contrast, referring to the illuminance map LM_MSFGWLS experiencing the MSFGWLS according to an example embodiment, blocking artifacts may not occur or be reduced in the same regions.

As a result, as illustrated in FIGS. 12A and 12B, an output image OUTPUT_MSFGWLS generated based on the illuminance map LM_MSFGWLS having undergone the MSFGWLS according to an example embodiment may have a better image quality than the final image OUTPUT_FGWLS generated based on the illuminance map LM_FGWLS according to the conventional FGWLS.

Figure 13:
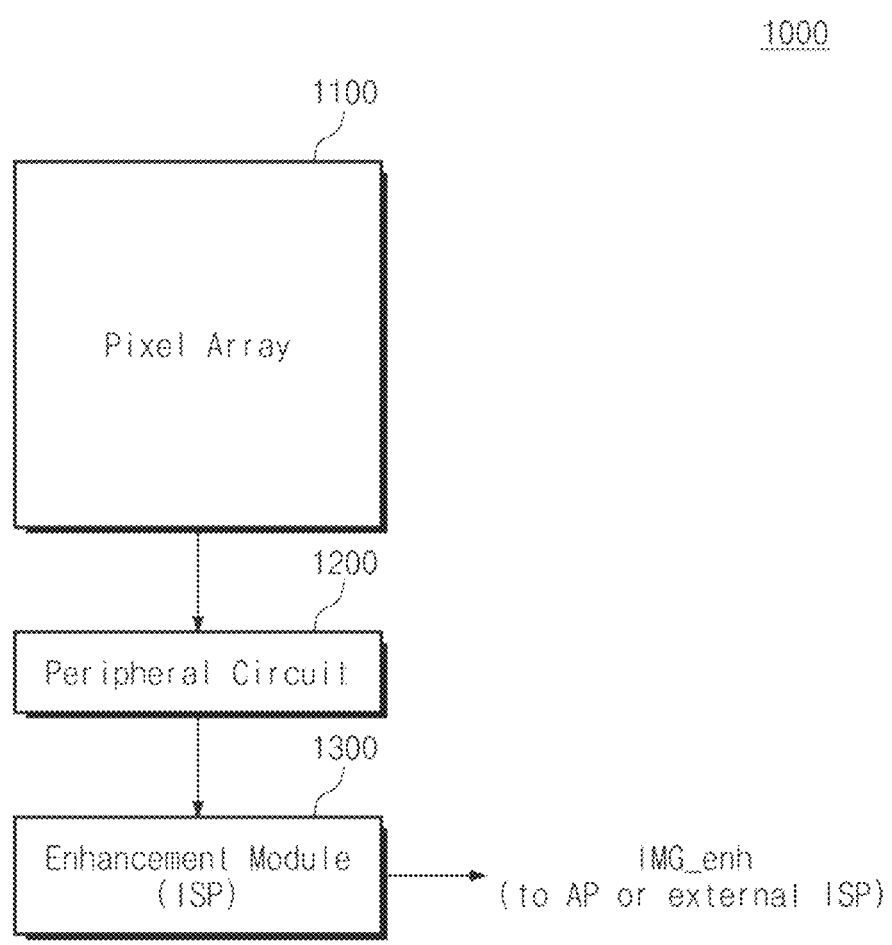
FIG. 13 is a block diagram illustrating an image sensor device according to an example embodiment.

FIG. 13 is a block diagram illustrating an image sensor according to an example embodiment. Referring to FIG. 13, an image sensor 1000 may include a pixel array 1100, a peripheral circuit 1200, and a processor including an enhancement module 1300.

The pixel array 1100 may include a plurality of pixels. The peripheral circuit 1200 may be configured to process information obtained from the plurality of pixels of the pixel array 1100. In an example embodiment, the peripheral circuit 1200 may include various components, which are necessary to generate image data at the image sensor 1000, such as a row driver, an analog-digital converter (ADC), a memory, and a ramp generator.

The enhancement module 1300 included in a processor may perform image signal processing on image data obtained by the peripheral circuit 1200 and may output the enhanced image IMG_enh. For example, example embodiments in which an image signal processor is implemented independently of an image sensor are described above, but embodiments are not limited thereto. For example, as illustrated in FIG. 13, all or at least a part of components of the image signal processor may be included in the image sensor 1000.

Figure 14:
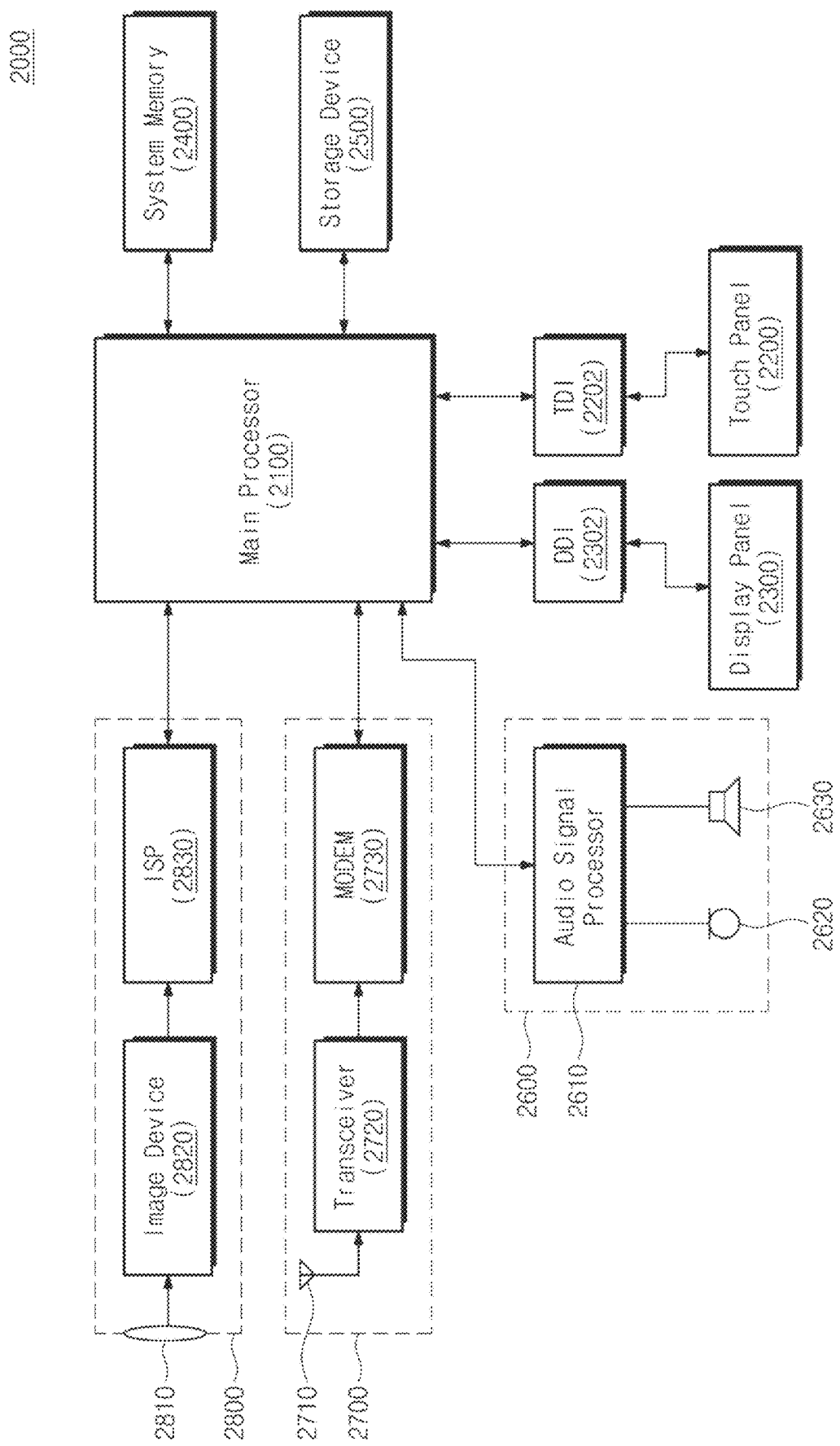
FIG. 14 is a block diagram illustrating an electronic device according to an example embodiment.

FIG. 14 is a block diagram illustrating an electronic device according to an example embodiment Referring to FIG. 14, an electronic device 2000 may include a main processor 2100, a touch panel 2200, a touch driving integrated circuit 2202, a display panel 2300, a display driving integrated circuit 2302, a system memory 2400, a storage device 2500, an audio processor 2600, a communication block 2700, and an image processor 2800. In an example embodiment, the electronic device 2000 may be one of various electronic devices such as a portable communication terminal, a personal digital assistant (PDA), a portable media player (PMP), a digital camera, a smartphone, a tablet computer, a laptop computer, and a wearable device.

The main processor 2100 may control overall operations of the electronic device 2000. The main processor 2100 may control/manage operations of the components of the electronic device 2000. The main processor 2100 may process various operations for the purpose of operating the electronic device 2000.

The touch panel 2200 may be configured to sense a touch input from a user under control of the touch driving integrated circuit 2202. The display panel 2300 may be configured to display image information under control of the display driving integrated circuit 2302.

The system memory 2400 may store data that are used for an operation of the electronic device 2000. For example, the system memory 2400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The storage device 2500 may store data regardless of whether a power is supplied. For example, the storage device 2500 may include at least one of various nonvolatile memories such as a flash memory, a PRAM, an MRAM, a ReRAM, and a FRAM. For example, the storage device 2500 may include an embedded memory and/or a removable memory of the electronic device 2000.

The audio processor 2600 may process an audio signal by using an audio signal processor 2610. The audio processor 2600 may receive an audio input through a microphone 2620 or may provide an audio output through a speaker 2630.

The communication block 2700 may exchange signals with an external device/system through an antenna 2710. A transceiver 2720 and a modulator/demodulator (MODEM) 2730 of the communication block 2700 may process signals exchanged with the external device/system, based on at least one of various wireless communication protocols: long term evolution (LTE), worldwide interoperability for microwave access (WiMax), global system for mobile communication (GSM), code division multiple access (CDMA), Bluetooth, near field communication (NFC), wireless fidelity (Wi-Fi), and radio frequency identification (RFID).

The image processor 2800 may receive a light through a lens 2810. An image device 2820 and an image signal processor 2830 included in the image processor 2800 may generate image information about an external object, based on a received light. In an example embodiment, the image signal processor 2830 may implement an enhancement module described with reference to FIGS. 1 to 13. For example, the image signal processor 2830 may be configured to extract an illuminance map associated with image data from the image device 2820 through the multi-scale based extraction operation described with reference to FIGS. 1 to 13. In an example embodiment, the image signal processor 2830 may be included in the main processor 2100, and the image signal processor 2830 may use the system memory 2400 as a memory for image signal processing.

According to example embodiments, an image signal processor may extract an illuminance map associated with an input image by iteratively performing a fast global weighted least squares (FGWLS) based operation on images of different resolutions included in a multi-scale image. As such, a blocking artifact of the extracted illuminance map may be prevented. Accordingly, a quality of a final image generated by the image signal processor is enhanced.

While example embodiments have been described with reference to the figures, it will be apparent to those of ordinary skill in the art that various changes and modifications may be made thereto without departing from the spirit and scope of the inventive concept as set forth in the following claims.

What is claimed is:

1. An operation method of an image signal processor (ISP) configured to perform signal processing on a raw image received from an image device, the operation method comprising:
generating a plurality of multi-scale images based on an input image, the plurality of multi-scale images having resolutions that are different from each other;
iteratively performing a fast global weighted least squares (FGWLS) based operation on each of the plurality of multi-scale images to generate a final illuminance map; and
outputting an enhanced image based on the final illuminance map and the input image.

2. The operation method of claim 1, wherein a result of a current FGWLS based operation is transferred to an input of a next FGWLS based operation during the iteratively performing the FGWLS based operation.

3. The operation method of claim 1, wherein the generating the plurality of multi-scale images comprises:
generating an initial illuminance map based on the input image; and
iteratively scaling down a size of the initial illuminance map n times to generate the plurality of multi-scale images, where n is a positive real number.

4. The operation method of claim 3, wherein the iteratively performing the FGWLS based operation based on the plurality of multi-scale images to generate the final illuminance map comprises:
performing a first FGWLS based operation by using a first image having a smallest resolution from among the plurality of multi-scale images as an input image and a guidance image;
scaling up a result of the first FGWLS based operation as much as n times to generate a first scale-up result;
performing a second FGWLS based operation by using the first scale-up result as an input image, and using a second image having a resolution that is identical to a resolution of the first scale-up result, from among the plurality of multi-scale images, as a guidance image;
scaling up a result of the second FGWLS based operation as much as n times to generate a second scale-up result;
performing a third FGWLS based operation by using the second scale-up result as an input image, and using a third image having a resolution that is identical to a resolution of the second scale-up result, from among the plurality of multi-scale images, as a guidance image; and
outputting a result of the third FGWLS based operation as the final illuminance map.

5. The operation method of claim 4, wherein the third image corresponds to the initial illuminance map.

6. The operation method of claim 1, wherein the outputting the enhanced image based on the final illuminance map and the input image comprises:
generating a gray image based on the input image;
extracting reflectance from the gray image based on the final illuminance map;
enhancing a global contrast of the final illuminance map to generate an enhanced illuminance map;
enhancing a local contrast of the reflectance to generate enhanced reflectance; and
combining the enhanced illuminance map and the enhanced reflectance to output the enhanced image.

7. The operation method of claim 6, wherein the enhancing the global contrast of the final illuminance map is performed based on a windowed inverse sigmoid (WIS) function.

8. The operation method of claim 6, wherein the combining the enhanced illuminance map and the enhanced reflectance to output the enhanced image comprises:
flattening the enhanced reflectance to generate flattened reflectance;
normalizing the enhanced illuminance map to generate a normalized illuminance map; and
generating an enhanced gray image through a linear combination of the enhanced reflectance and the flattened reflectance based on the normalized illuminance map.

9. The operation method of claim 8, wherein the flattening the enhanced reflectance comprises performing a FGWLS based operation on the enhanced reflectance.

10. The operation method of claim 8, wherein the outputting the enhanced image further comprises:
outputting the enhanced image based on the enhanced gray image, the input image, and the gray image.

11. The operation method of claim 1, further comprising:
receiving the raw image from the image device; and
performing pre-processing on the raw image to generate the input image.

12. The operation method of claim 11, wherein performing the pre-processing comprises:
reducing a noise of the raw image;
performing white balancing on a result of the reducing the noise;
performing color filter array interpolation on a result of the white balancing; and
performing correction on a result of the color filter array interpolation to generate the input image.

13. An image system comprising:
an image sensor configured to output a raw image based on a light reflected from an external object; and
an image signal processor configured to:
perform pre-processing on the raw image to generate an input image,
extract a final illuminance map from the input image through a multi-scale based extraction operation, and
generate an enhanced image based on the final illuminance map and the input image,
wherein the multi-scale based extraction operation comprises:
generating a plurality of multi-scale images having different resolutions based on the input image;
iteratively performing an illuminance map extraction operation on the plurality of multi-scale images; and
outputting the final illuminance map as a result of iteratively performing the illuminance map extraction operation.

14. The image system of claim 13, wherein the plurality of multi-scale images are generated by iteratively scaling down an initial illuminance map, which is generated based on the input image, as much as n times to have the different resolutions, where n is a positive integer greater than 1.

15. The image system of claim 14, wherein the illuminance map extraction operation is performed based on:

$$L^i(x, y) = \begin{cases} FGWLS\left(\uparrow_n(L^{i+1}(x, y)), G^i(x, y), \lambda^i, T^i\right), & i = 0, \ldots, l-1 \\ FGWLS\left(\tilde{L}^i(x, y), G^i(x, y), \lambda^i, T^i\right), & i = l \end{cases}$$

where (x,y) is a pixel location, FGWLS is a function for a fast global weighted least squares (FGWLS) based operation, $L^i$ is a calculation result of the FGWLS, $\uparrow_n$ is a function to scale up an input as much as the n times, $\hat{L}^i$ is an illuminance map obtained by scaling down the initial illuminance map as much as $n^i$ times, $G^i$ is a guidance image, $\lambda^i$ is a flattening level used in the function of the FGWLS based operation, and $T^i$ is a number of times of row-based calculation and column-based calculation used in the function for the FGWLS based operation, and wherein the illuminance map extraction operation is performed based on the i that stepwise changes from 1 to 0.

16. The image system of claim 15, wherein the guidance image is a corresponding image of the plurality of multi-scale images.

17. An image contrast enhancing method of an image signal processor, the image contrast enhancing method comprising:

generating an initial illuminance map based on an input image;

iteratively scaling down the initial illuminance map as much as n times to generate a plurality of multi-scale images, where n is a positive integer greater than 1;

performing a first calculation based on a first image having a lowest resolution from among the plurality of multi-scale images;

performing a second calculation based on a result of the first calculation and a second image having a second lowest resolution from among the plurality of multi-scale images;

performing a third calculation based on a result of the second calculation and a third image having a highest resolution from among the plurality of multi-scale images;

generating a result of the third calculation as a final illuminance map; and generating an enhanced image based on the final illuminance map and the input image, wherein the first calculation, the second calculation, and the third calculation are based on fast global weighted least squares (FGWLS).

18. The image contrast enhancing method of claim 17, wherein the first calculation is performed based on a first input, a first guidance image, a first flattening level, and a first iteration count, wherein the second calculation is performed based on a second input, a second guidance image, a second flattening level, and a second iteration count, wherein the third calculation is performed based on a third input, a third guidance image, a third flattening level, and a third iteration count, wherein the first input is the first image, wherein the second input is an image obtained by enlarging the result of the first calculation as much as the n times, wherein the third input is an image obtained by enlarging the result of the second calculation as much as the n times, wherein the first guidance image is the first image, wherein the second guidance image is the second image, and wherein the third guidance image is the third image.

19. The image contrast enhancing method of claim 17, wherein the generating the enhanced image based on the final illuminance map and the input image comprises:

extracting reflectance from a gray image corresponding to the input image based on the final illuminance map;

enhancing a global contrast of the final illuminance map to generate an enhanced illuminance map;

enhancing a local contrast of the reflectance to generate enhanced reflectance; and combining the enhanced illuminance map and the enhanced reflectance to output an enhanced gray image.

20. The image contrast enhancing method of claim 19, wherein the generating the enhanced image based on the final illuminance map and the input image further comprises:

recovering a color of the enhanced gray image based on the input image to generate the enhanced image.

* * * * *